(12) United States Patent
James et al.

(10) Patent No.: US 7,658,012 B2
(45) Date of Patent: Feb. 9, 2010

(54) DRIVE MECHANISM AND POWER TOOL

(75) Inventors: Thomas P. James, Oconomowoc, WI (US); Roger D. Neitzell, North Prairie, WI (US); David A. Hempe, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 14 days.

(21) Appl. No.: 10/742,969

(22) Filed: Dec. 22, 2003

(65) Prior Publication Data

US 2004/0187324 A1 Sep. 30, 2004

Related U.S. Application Data

(60) Provisional application No. 60/436,428, filed on Dec. 23, 2002.

(51) Int. Cl.
*B27B 19/04* (2006.01)

(52) U.S. Cl. .................. 30/392; 30/394; 74/50

(58) Field of Classification Search ............ 30/392, 30/394, 393, 277.4; 74/25, 50, 54, 61
See application file for complete search history.

(56) References Cited

U.S. PATENT DOCUMENTS

| | | | |
|---|---|---|---|
| 1,035,524 A | 8/1912 | Bradley | |
| 1,542,127 A | * 6/1925 | Hastings | ..................... 30/377 |
| 1,666,539 A | 4/1928 | Michell | |
| 2,084,321 A | 6/1937 | Corradino et al. | |
| 2,563,789 A | 8/1951 | Kurtz et al. | |
| 2,630,148 A | 3/1953 | Ferguson | |
| 2,781,800 A | 2/1957 | Papworth | |
| 2,793,661 A | 5/1957 | Olson | |
| 2,830,456 A | 4/1958 | Stafford | |
| 2,879,815 A | 3/1959 | Papworth | |
| 2,946,358 A | 7/1960 | Bruck | |

(Continued)

FOREIGN PATENT DOCUMENTS

CH 256612 8/1948

(Continued)

OTHER PUBLICATIONS

Advertisement showing Bosch Dual stroke reciprocating saw, published prior to Oct. 22, 1999.

(Continued)

*Primary Examiner*—Hwei-Siu C Payer
(74) *Attorney, Agent, or Firm*—Michael Best & Friedrich LLP

(57) ABSTRACT

A reciprocating saw generally includes a housing and a motor supported by the housing. A spindle is mounted for reciprocation relative to the housing, the spindle having a front end for supporting a saw blade and being movable through a cutting stroke and a return stroke, and the cutting stroke may have a stroke length. A rotary member may be supported for rotation about a rotary axis. The saw may further include an adjusting assembly operable to adjust the stroke length of the spindle. Also, the saw may include a counterweight supported for movement relative to the housing, a movement of the counterweight substantially balancing at least a portion of movement of the spindle, and an adjusting assembly operable to adjust the movement of the counterweight.

41 Claims, 25 Drawing Sheets

U.S. PATENT DOCUMENTS

| | | |
|---|---|---|
| 2,961,016 A | 11/1960 | Papworth |
| 2,984,757 A | 5/1961 | Papworth |
| 3,206,989 A | 9/1965 | Enders |
| 3,280,683 A | 10/1966 | Djurberg |
| 3,305,031 A * | 2/1967 | Bez et al. .................. 173/115 |
| 3,585,719 A | 6/1971 | Kivela |
| 3,596,525 A | 8/1971 | Niesz |
| 3,802,079 A | 4/1974 | Ketchpel, Jr. et al. |
| 3,945,120 A | 3/1976 | Ritz |
| 3,978,862 A | 9/1976 | Morrison |
| 4,031,763 A * | 6/1977 | Eisenberg ..................... 74/50 |
| 4,125,033 A | 11/1978 | Riedl |
| 4,233,850 A | 11/1980 | Edwardson |
| 4,255,858 A | 3/1981 | Getts |
| 4,262,421 A * | 4/1981 | Bergler et al. ................ 30/393 |
| 4,272,996 A | 6/1981 | Sauerwein |
| 4,545,123 A | 10/1985 | Hartmann |
| 4,989,488 A | 2/1991 | Potzsch |
| 5,007,172 A | 4/1991 | Palm |
| 5,025,562 A | 6/1991 | Palm |
| 5,036,925 A | 8/1991 | Wache |
| 5,050,307 A | 9/1991 | Palm |
| 5,078,017 A | 1/1992 | Zornes |
| 5,079,844 A | 1/1992 | Palm |
| 5,099,705 A * | 3/1992 | Dravnieks ..................... 74/50 |
| 5,134,777 A | 8/1992 | Meyer et al. |
| 5,201,749 A | 4/1993 | Sachse et al. |
| 5,212,887 A | 5/1993 | Farmerie |
| 5,369,887 A | 12/1994 | Keevers |
| 5,450,925 A | 9/1995 | Smith et al. |
| RE35,258 E | 6/1996 | Palm |
| 5,561,909 A | 10/1996 | Berg et al. |
| 5,566,458 A | 10/1996 | Bednar |
| 5,581,896 A | 12/1996 | Yang |
| 5,598,636 A | 2/1997 | Stolzer |
| 5,607,023 A | 3/1997 | Palm |
| 5,607,265 A | 3/1997 | Lane |
| 5,689,891 A | 11/1997 | Bednar et al. |
| 5,782,000 A | 7/1998 | Bednar |
| 5,924,209 A | 7/1999 | Ward |
| 5,940,977 A | 8/1999 | Moores, Jr. |
| 5,946,810 A | 9/1999 | Hoelderlin et al. |
| 5,964,039 A | 10/1999 | Mizoguchi et al. |
| 6,012,346 A | 1/2000 | Vo |
| 6,021,573 A | 2/2000 | Kikuchi et al. |
| 6,212,781 B1 | 4/2001 | Marinkovich et al. |
| 6,234,255 B1 | 5/2001 | Feldmann et al. |
| 6,357,125 B1 * | 3/2002 | Feldmann et al. ............. 30/392 |
| 6,742,267 B2 * | 6/2004 | Marinkovich et al. ......... 30/394 |
| 6,772,662 B2 * | 8/2004 | Marinkovich et al. ......... 83/34 |
| 2001/0034942 A1 * | 11/2001 | Marinkovich et al. ......... 30/393 |

FOREIGN PATENT DOCUMENTS

| | | |
|---|---|---|
| DE | 2749875 | 10/1979 |
| DE | 3828785 | 4/1989 |
| EP | 1232817 | 8/2002 |
| GB | 1044754 | 10/1966 |
| GB | 2048420 | 12/1980 |
| WO | WO 98/07544 | 2/1998 |
| WO | WO 00/47358 | 8/2000 |

OTHER PUBLICATIONS

Product description for Bosch Reciprocating Saw Kit 1634 VSK from http://www.boschtools.com/cd-html/s0300305.htm, visited Jul. 30, 2000.

Product description for Bosch In-Line Grip Jigsaw 3294 EVS from http://www.boschtools.com/cd-html/s0300290.htm, visited Jul. 30, 2000.

* cited by examiner

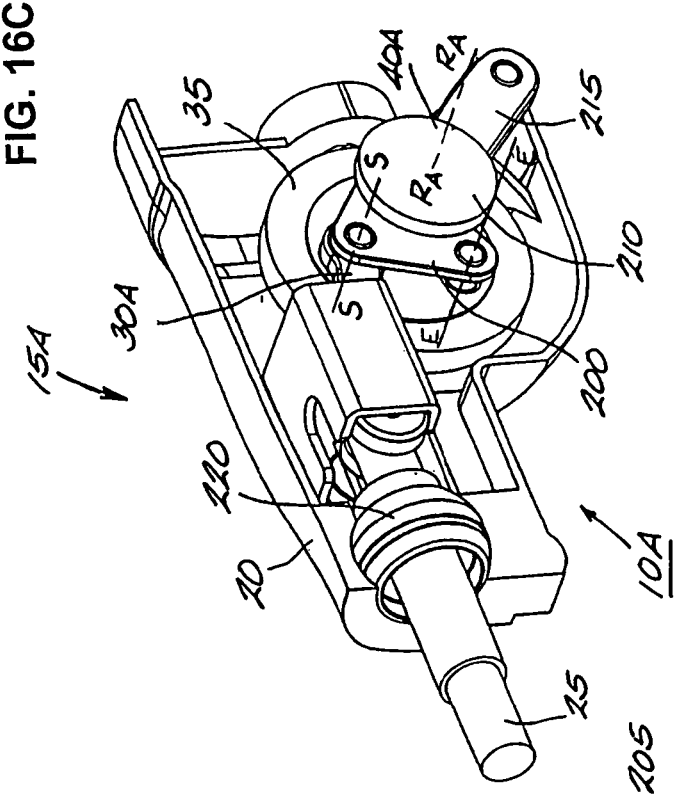
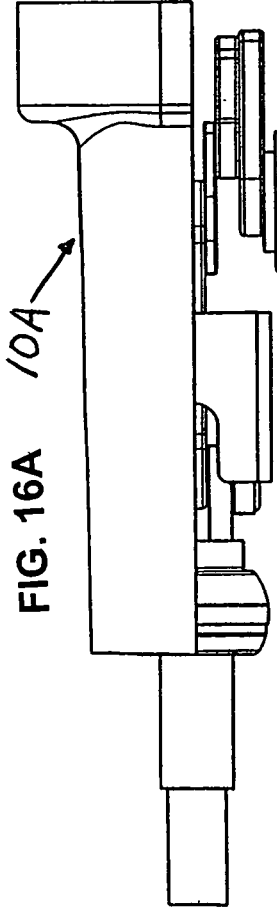
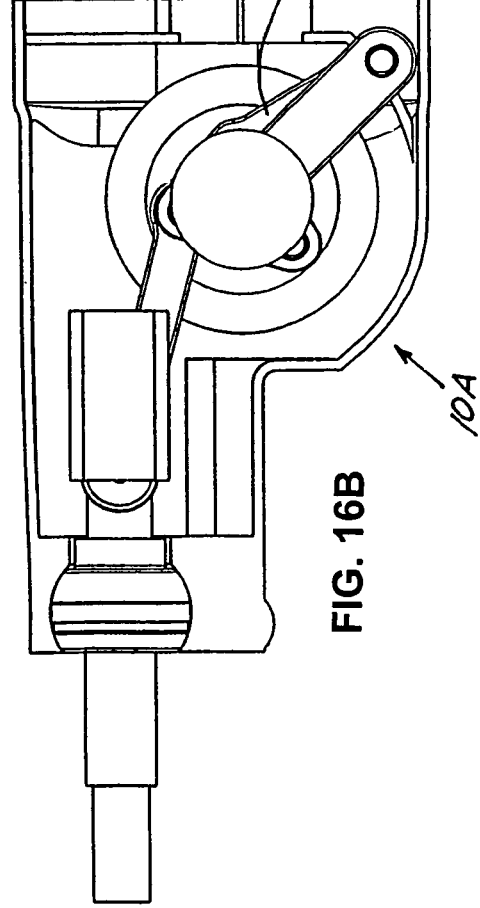
FIG. 16C
FIG. 16A
FIG. 16B
MAXIMUM STROKE LENGTH - FULL FORWARD POSITION

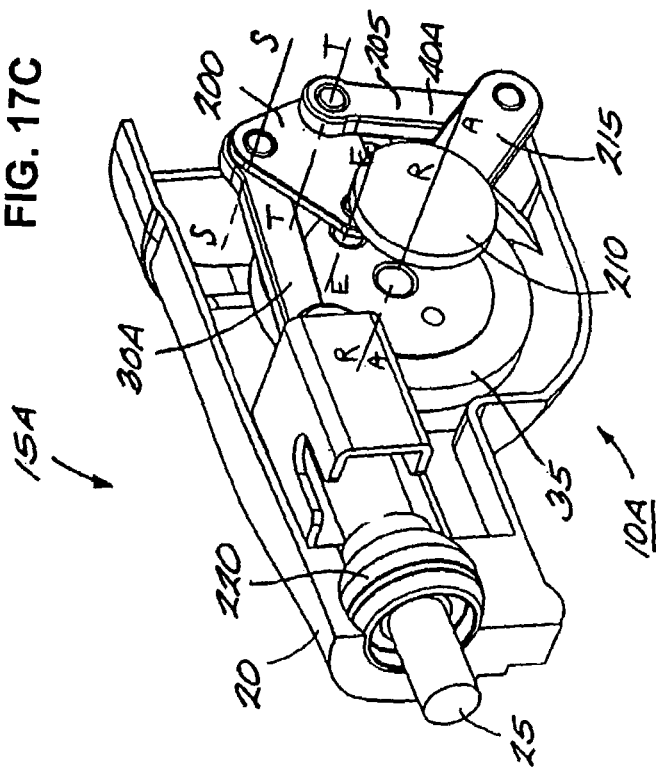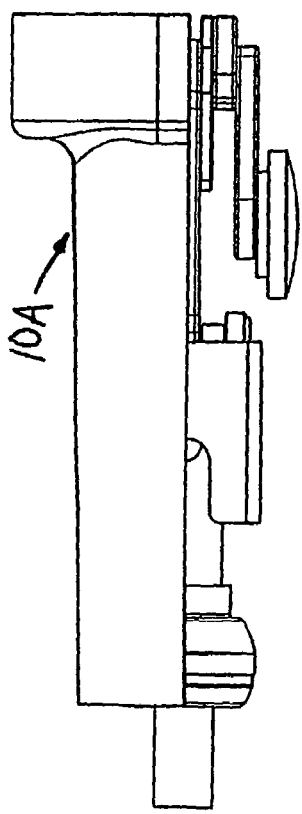

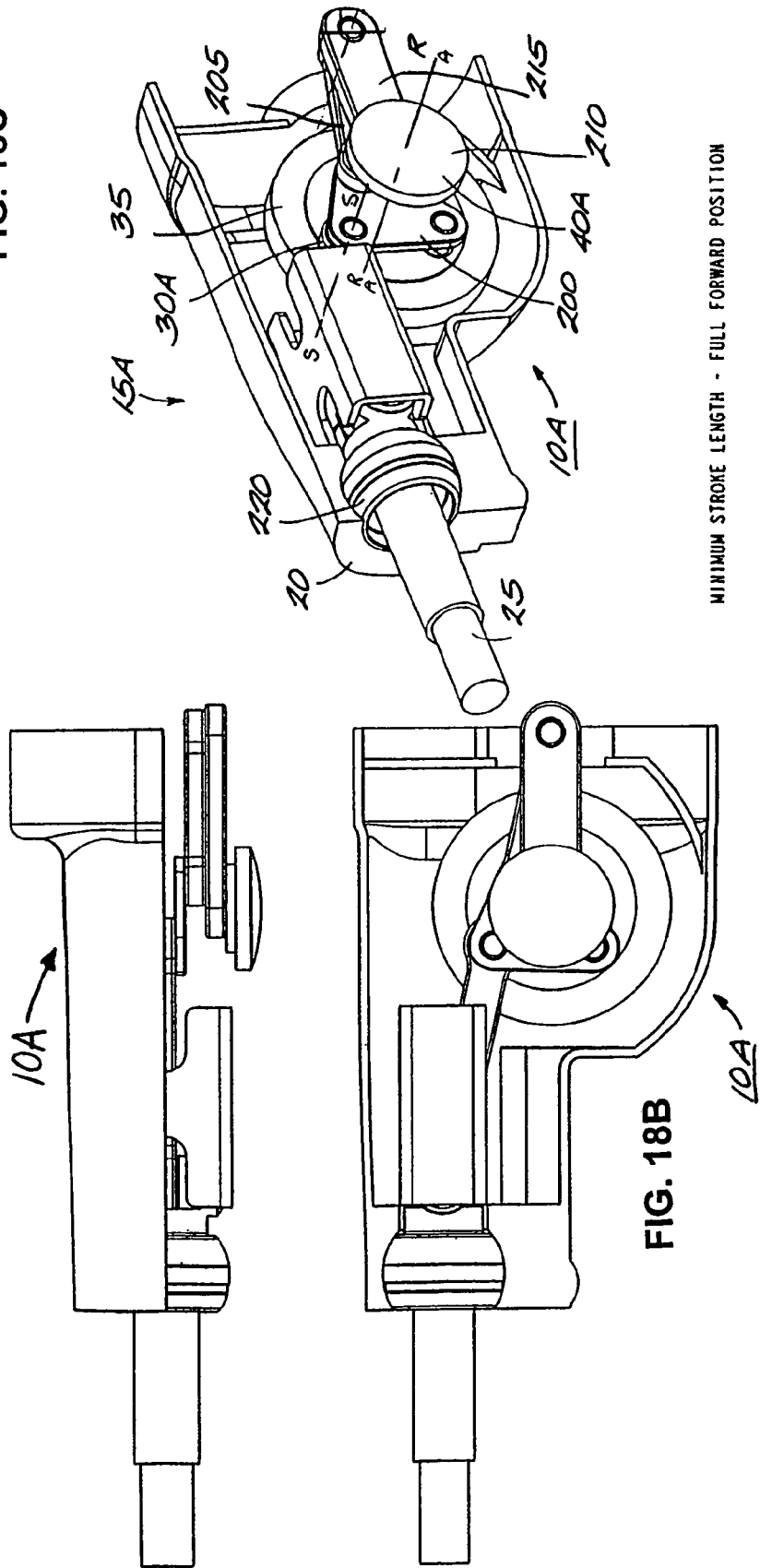

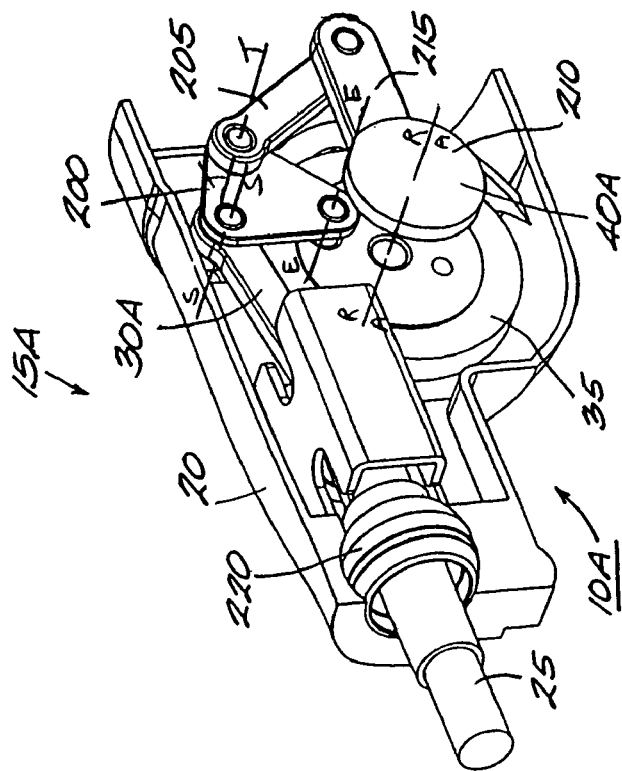
FIG. 19C
MINIMUM STROKE LENGTH - FULL BACK POSITION
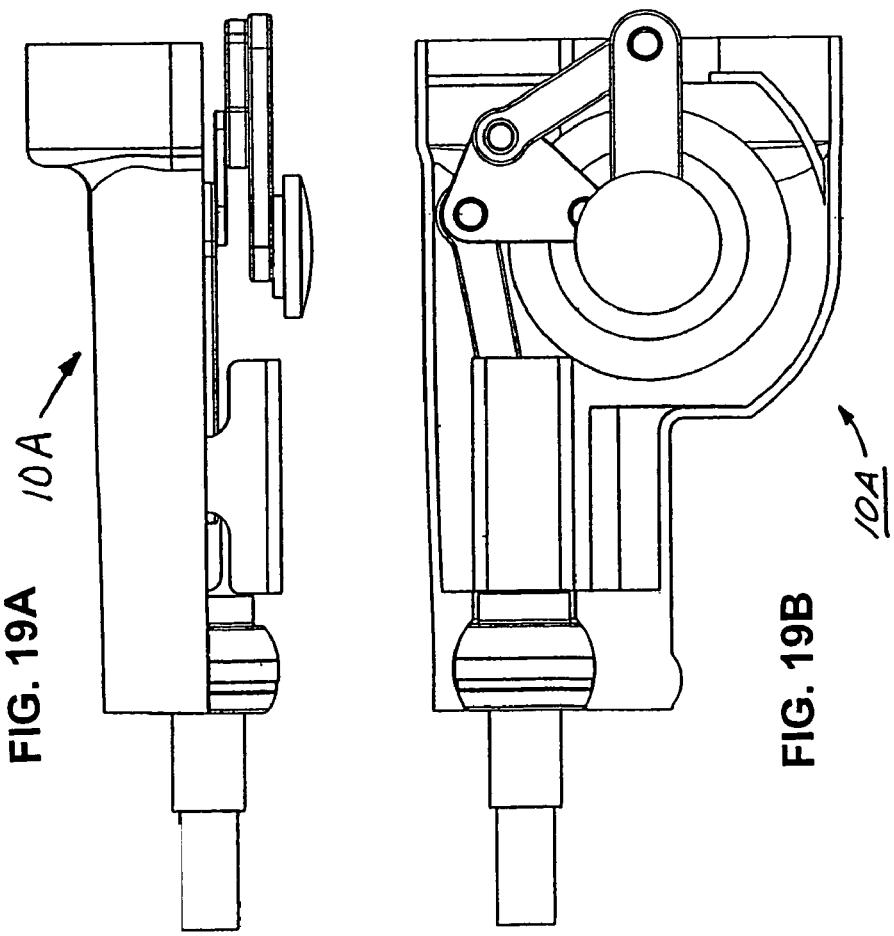
FIG. 19A
FIG. 19B

DRIVE MECHANISM AND POWER TOOL

RELATED APPLICATIONS

The present application claims the benefit of prior-filed, provisional patent application Ser. No. 60/436,428, filed Dec. 23, 2002, the contents of which is hereby incorporated by reference.

FIELD OF THE INVENTION

The invention relates generally to power tools and, more particularly, to a drive mechanism for a power tool.

BACKGROUND OF THE INVENTION

A reciprocating power tool, such as a reciprocating saw, generally includes a housing, a motor supported by the housing, a drive mechanism and a reciprocating output member, such as a reciprocating spindle, driven by the drive mechanism. The output member supports a tool element, such as a saw blade, and is movable through a cutting stroke. Typically, the drive mechanism moves the output member through a cutting stroke having a fixed stroke length.

SUMMARY OF THE INVENTION

The present invention provides a drive mechanism, a reciprocating device, a reciprocating power tool and a reciprocating saw which alleviates one or more independent problems with existing drive mechanisms and power tools. In some aspects and in some constructions, the invention may generally provide a reciprocating drive mechanism having a stroke length which may be adjustable to any stroke length including and between a minimum stroke length and a maximum stroke length. In some aspects and in some constructions, the invention may generally provide a counterbalance mechanism which may be adjustable to change a counterbalance force. In some aspects and in some constructions, the invention may generally provide a reciprocating mechanism having an adjustable stroke length and a counterbalance mechanism which may be adjustable to counterbalance a force caused by the reciprocating mechanism in one or more adjusted stroke lengths.

One or more independent features and independent advantages of the present invention will become apparent to those skilled in the art upon review of the following detailed description and drawings.

BRIEF DESCRIPTION OF THE DRAWINGS

FIGS. 16A-16C are views of a second alternative construction of a reciprocating saw and illustrated configured for a maximum stroke length with the spindle in the forward position.

FIGS. 17A-17C are views of the reciprocating saw shown in FIGS. 16A-16C and configured as shown in FIGS. 16A-16C with the spindle in the rearward position.

FIGS. 18A-18C are views of the reciprocating saw shown in FIGS. 16A-16C configured for a minimum stroke length and illustrated configured for a minimum stroke length with the spindle in the forward position.

FIGS. 19A-19C are views of the reciprocating saw shown in FIGS. 18A-18C and configured as shown in FIGS. 18A-18C with the spindle in the rearward position.

Figure 1:
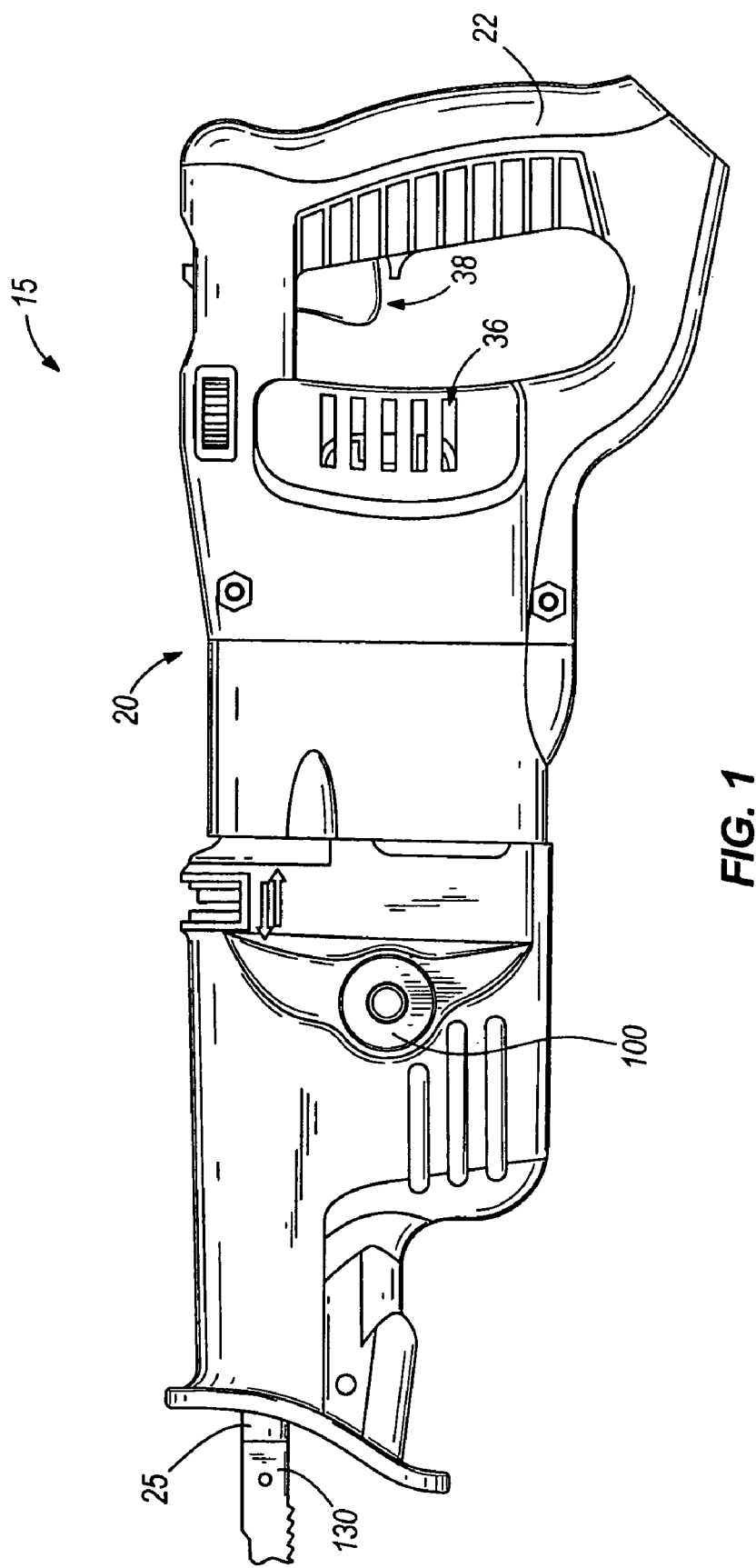
FIG. 1 is a side view of a power tool, such as a reciprocating saw.

Before at least one construction of the invention is explained in detail, it is to be understood that the invention is not limited in its application to the details of the construction and the arrangements of components set forth in the following description or illustrated in the drawings. The invention is capable of other constructions and of being practiced or being carried out in various ways. Also, it is understood that the phraseology and terminology used herein is for the purpose of describing the illustrated construction and should not be regarded as limiting the scope of the invention. The use of "including" and "comprising" and variations thereof herein is meant to encompass the items listed thereafter and equivalents thereof as well as additional items.

DETAILED DESCRIPTION

Figure 2:
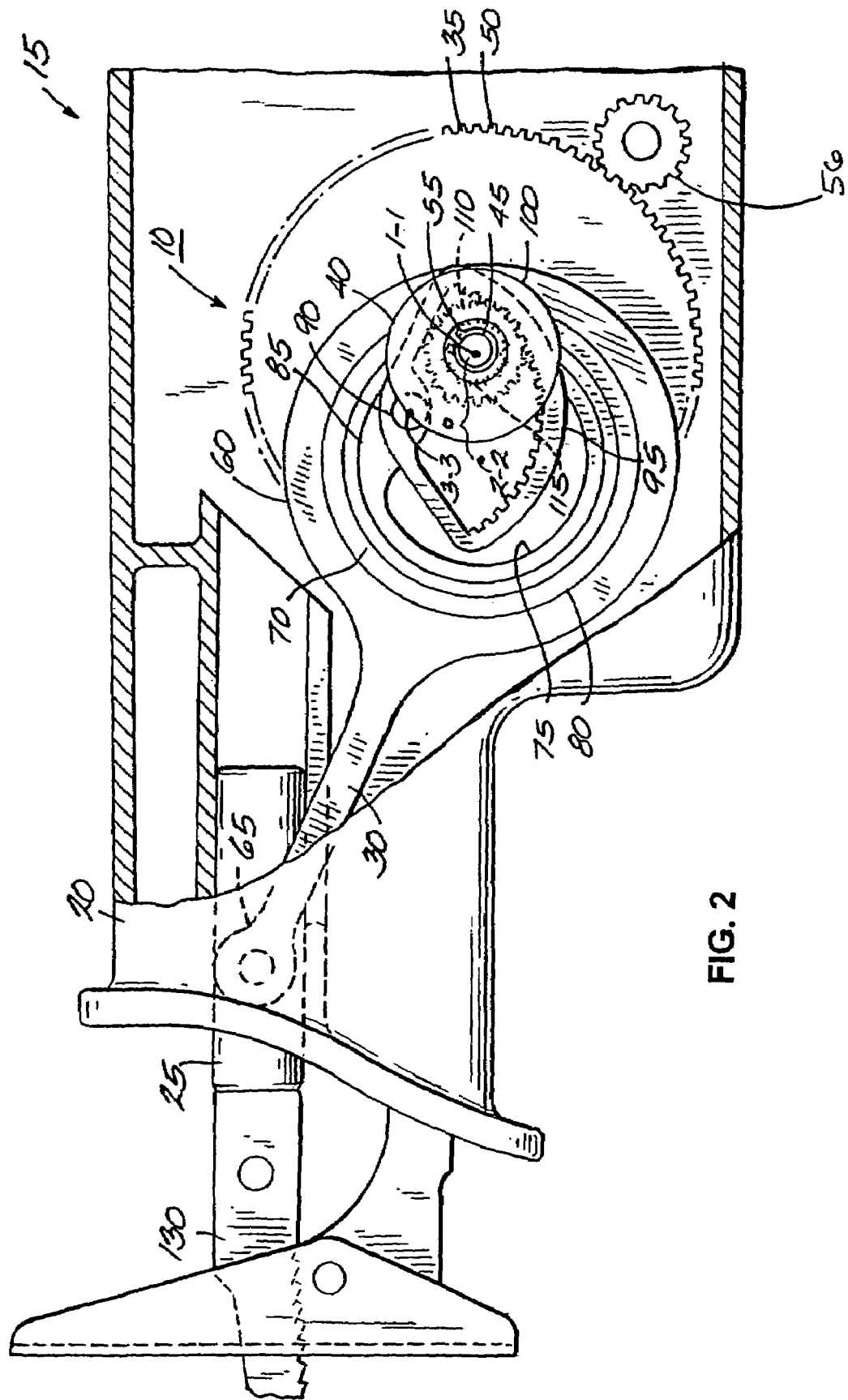
FIG. 2 is a partial cross-sectional side view of the reciprocating saw shown in FIG. 1 and illustrated configured for a maximum stroke length with the spindle and the saw blade in the forward or "extended" position.

FIGS. 1 and 2 illustrate a drive mechanism 10 for producing an adjustable stroke length reciprocating motion in a reciprocating device or power tool, such as a reciprocating saw 15. The reciprocating saw 15 includes a body or housing 20 and an operator's main handle or grip 22 connected to a rearward end of the housing 20. The mechanism 10 is supported by the housing 20 of the saw 15 and, in the illustrated construction, includes a spindle 25, an arm member 30, a rotary member 35, and an adjusting member 40. The housing 20 defines a portion of the casing of the saw 15 and provides support for the various internal components, including a motor 36.

As shown in FIG. 1, in some constructions, the motor is an electric motor that is connectable to a power source (not shown), for example, to a separate AC or DC power source by a plug (not shown but connectable to the grip 22) or to a battery (not shown) supported on the grip 22 or on the housing 20. An electrical circuit (not shown) is operable to connect the motor 36 to the power source. The circuit includes a switch assembly 38 which connects the motor 36 to the power source.

The mechanism 10 operates to generally reciprocate the spindle 25 along the spindle axis. It should be understood that the reciprocating motion may be substantially linear along the spindle axis. The saw 15 may also include a mechanism (not shown) to provide a non-linear (i.e., orbital motion, rocker motion, etc.) reciprocating motion for the spindle 25 and for the tool supported by the spindle 25.

Figure 5:
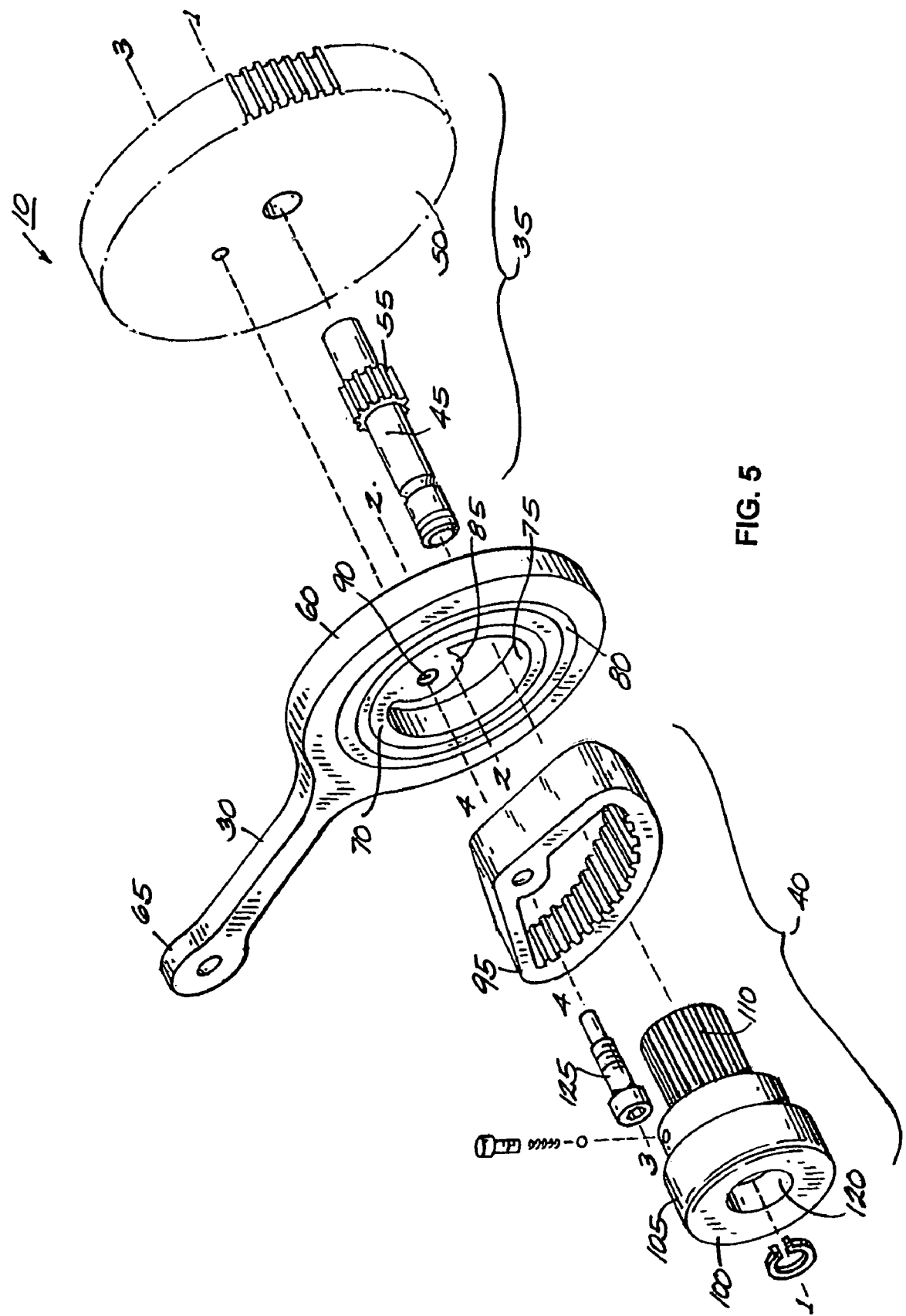
FIG. 5 is an exploded perspective view of the portion of the reciprocating saw shown in FIG. 4.

FIG. 5 illustrates the components of FIG. 2 in an exploded view. The rotary member 35 further includes a drive shaft 45, a drive gear 50, and an adjusting gear 55. The drive shaft 45 is generally cylindrical in shape with a central axis that is coincident with the rotary axis 1-1 of the mechanism 10. The adjusting gear 55 is generally manufactured with the shaft 45 as one continuous piece. However, a separate gear connected to the shaft 45 may also be used (i.e., a gear shrunk onto the shaft 45, pinned to the shaft 45, etc., to assure that the two components operate as a single integral piece).

In the illustrated construction, the drive gear 50 is larger than the adjusting gear 55 and can be connected to the shaft 45 in many different ways. For example, the drive gear 50 could be shrunk on to the shaft 45 or keyed to the shaft 45. The motor 36 includes a drive pinion 56 or other drive member which engages the drive gear 50 to produce rotation at the desired speed. The drive engagement between drive pinion 56 and the drive gear 50 may be provided by a helical gear arrangement, a worm gear arrangement, bevel gear arrangement, etc. The housing 20 supports at least one end of the drive shaft 45 so that the shaft 45 remains free to rotate about the rotary axis 1-1 but is unable to translate.

The arm member 30 includes a drive end 60, a narrow neck region, and a spindle end 65. The neck region connects the drive end 60 to the spindle end 65. In the construction illustrated in FIGS. 1-2 and 5-7, the spindle end 65 resides within a portion of the housing 20 that is shaped to constrain the spindle end 65 to a linear reciprocating motion. The drive end 60 defines a large bore sized to concentrically receive and support a bearing member 70.

The bearing member 70 further includes an inner race 75, an outer race 80, and a cage member retaining roller members (not shown). The outer race 80 fits snuggly within the drive end 60 of the arm member 30. The inner race 75 defines a tab region 85 that facilitates attachment of the arm member 30 to the adjusting member 40 and to the drive gear 50. The tab region 85 projects into the opening defined by the inner race 75. The tab member 85 further defines an attachment hole 90 positioned along an eccentric axis 3-3.

Figure 4:
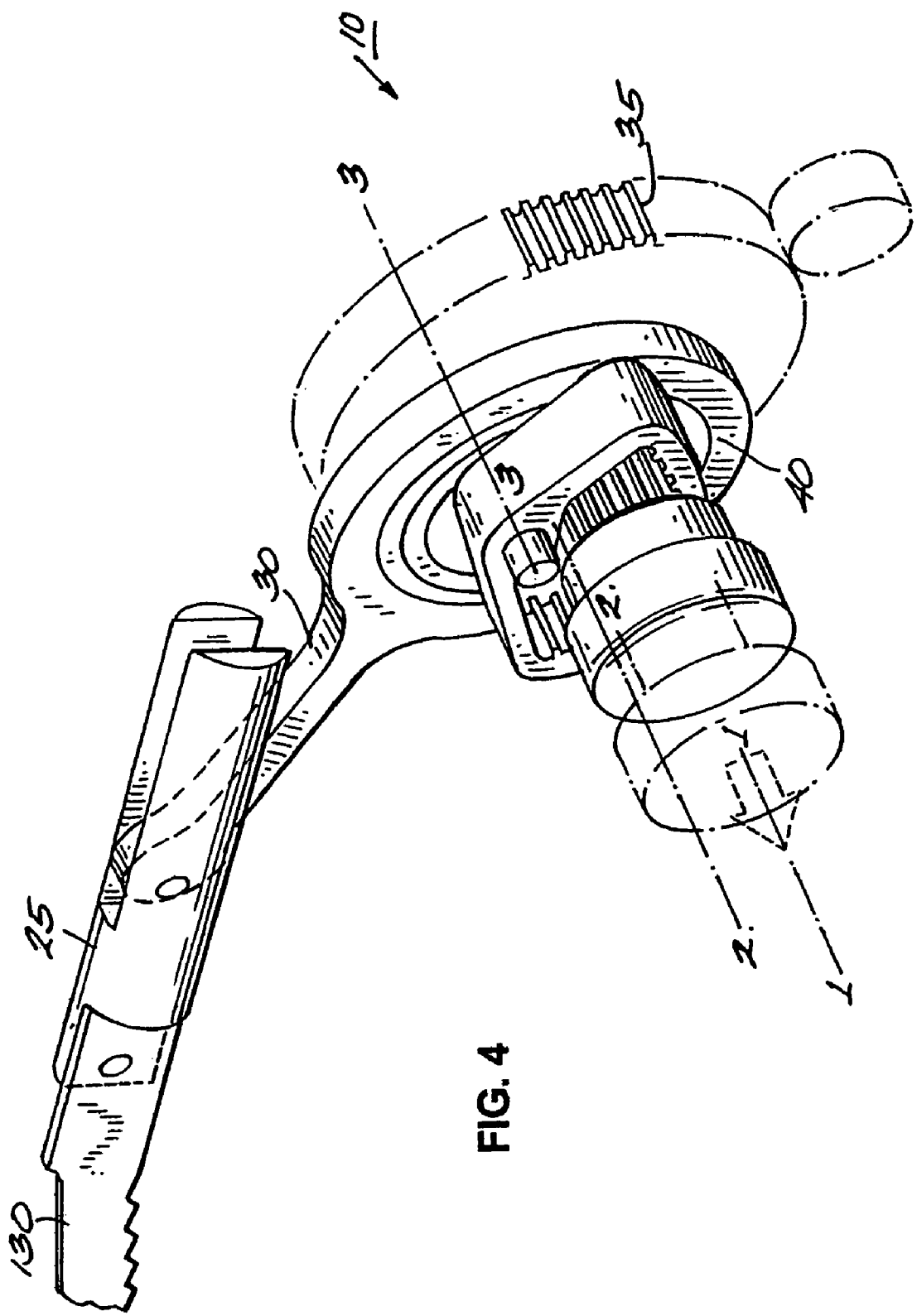
FIG. 4 is a perspective view of a portion of the reciprocating saw shown in FIG. 2.

The adjusting member 40, illustrated in FIG. 4, includes an arcuate gear 95 and a knob member 100. The arcuate gear 95 comprises a partial ring gear having gear teeth on its internal surface. In the illustrated construction, the arcuate gear 95 occupies approximately 120 degrees of a complete circular gear. It should be understood, however, that larger or smaller included angles are possible. The attachment hole 90 extends along the arcuate gear central axis 4-4 and facilitates attachment of the arcuate gear 95 to the arm member 30 and to the drive gear 50.

The knob member 100 further includes a grip portion 105, an external gear portion 110, and an internal gear portion 115, shown in FIGS. 2-3 and 6-8. The grip portion 105 generally extends out of the housing 20 to allow the user to operate the adjustment assembly to adjust the stroke length of the spindle 25. The external gear portion 110 engages the arcuate gear 95 so that rotation of the grip portion 105 also rotates the external gear 110. Rotation of the external gear produces a corresponding movement of the arcuate gear 95.

A bore 120 extending at least partially through the knob member 100 allows the knob member 100 to slide along the drive shaft 45. Concentric with the bore 120 is the internal gear portion 115 extending along the bore 120 to a depth. The internal gear portion 115 is selectively engageable with the adjusting gear 55 located on the drive shaft 45. The depth of the internal gear portion 115 is less than the length of the external gear portion 110 to allow the internal gear portion 115 to disengage the adjusting gear 55 while the external gear portion 110 remains engaged with the arcuate gear 95. When the internal gear portion 115 is engaged, the knob member 100 rotates with the drive shaft 45, rotating the arcuate gear 95 and the bearing inner race 75 in unison.

As shown in FIG. 5, in some constructions, to assemble the saw 15, the rotary member 35 is installed into the saw housing 20. The adjusting gear 55 connects to the drive shaft 45, if not manufactured as part of the shaft 45, followed by attachment of the drive gear 50. The first end of the drive shaft 45 is then placed into the housing 20 so that the second end extends away from the housing 20 and the adjusting gear 55 is exposed. The bearing member 70 is assembled into the arm member 30 and the arm member 30 is placed over the drive shaft 45 so that the shaft 45 passes through the opening defined by the bearing inner race 75.

The spindle end 65 of the arm member 30 connects to the spindle 25 as shown in FIG. 4. The housing 20 supports the spindle 25 so that the spindle 25 moves only in a reciprocating motion. A screw 125 passes through the attachment hole 90 provided in the arcuate gear member 95 and fixedly attaches the arcuate gear member 95 to the tab member 85 provided in the bearing inner race 75. The screw 125 further extends along the eccentric axis 3-3 where it passes at least partially through the drive gear 50. The screw 125 fixedly attaches the arcuate gear member 95 to the arm member 30 and rotatably connects the arcuate gear member 95 and arm member 30 to the drive gear 50 so that they are able to rotate about the eccentric axis 3-3. The knob member 100 slides over the drive shaft 45, first engaging the arcuate gear 95 and second engaging the adjusting gear 55. A snap ring installed on the end of the shaft 45 prevents the unwanted removal of the knob member 100.

In operation, the knob member 100 selectively engages the adjusting gear 55 preventing or allowing adjustment of the stroke length of the spindle 25. To adjust the stroke length, in the illustrated construction, a user pulls the knob member 100 away from the adjusting gear 55 of the rotary member 35. Once the inner gear 115 of the knob member 100 disengages the adjusting gear, the knob member 100 is free to rotate independently of the rotary member 35. Rotation of the knob member 100 in a first, in the illustrated construction, clockwise direction results in increased or longer stroke lengths, and rotation in a second, in the illustrated construction, counter-clockwise rotation results in reduced or shorter stroke lengths.

Once the desired stroke length of the spindle 25 is set, the user pushes the knob member 100 back towards the adjusting gear 55 until the adjusting gear 55 engages the knob member 100 inner gear portion 115. Once engaged, the adjusting member 40 is rotatably connected to the rotary member 35. Rotation of the rotary member 35 about the rotary axis 1-1 results in a reciprocating motion having the desired stroke length at the spindle 25.

Figure 3:
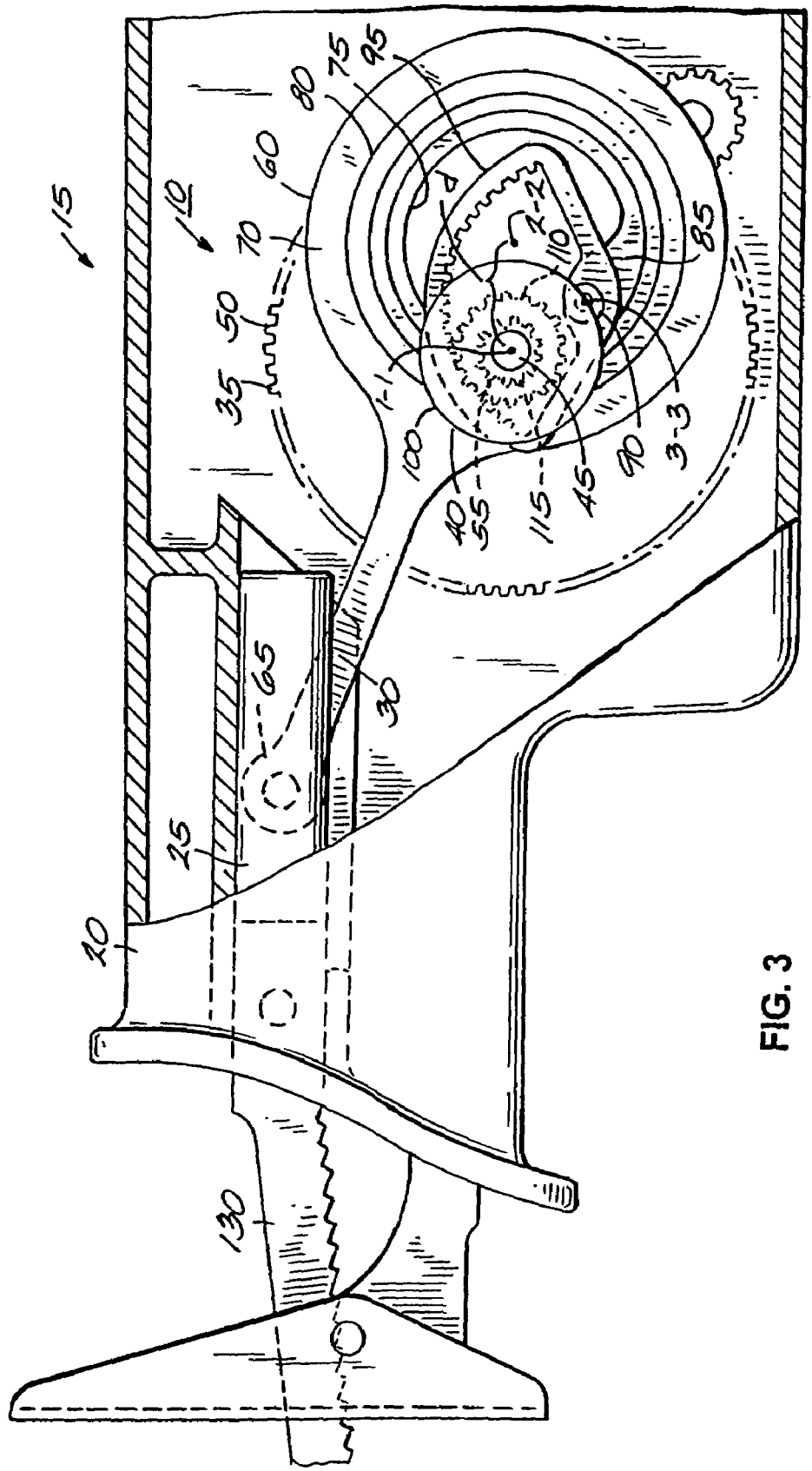
FIG. 3 is a partial cross-sectional side view of the reciprocating saw configured as shown in FIG. 2 with the spindle and the saw blade in the rearward or "retracted" position.

Referring now to FIGS. 2 and 3, the mechanism 10 is illustrated in a "maximum" stroke length configuration. Specifically, FIG. 2 shows the spindle 25 and the saw blade 130 in the most forward position, and FIG. 2 shows the spindle 25 and the saw blade 130 in the most rearward position. The arcuate gear 95 connects to the bearing inner race 75 so that the bearing center axis 2-2 passes within the opening defined by the arcuate gear 95. The eccentric axis 3-3, defined along the screw 125 that attaches the arcuate gear 95 to the bearing inner race 75, is offset a distance from the rotary axis 1-1. The screw 125 extends through the arcuate gear 95 and the bearing inner race 75 and extends at least partially into the drive gear 50 to fix the location of the eccentric axis 3-3 relative to the rotary axis 1-1.

In the illustrated construction, rotation of the knob member 100 toward its first or extreme clockwise position results in a corresponding movement of the bearing center axis 2-2 away from the rotary axis 1-1. The further the bearing center axis 2-2 is from the rotary axis 1-1 the larger the stroke length at the spindle end 65 of the arm member 30.

Referring now to FIG. 3, the mechanism 10 is illustrated configured as in FIG. 2 and following about a one-half revolution of the rotary member 35. As can be seen, the orientation of the adjusting member 55, bearing inner race 75, and rotary member 35 have remained substantially constant with respect to one another, while the arm member 30 has substantially maintained its orientation relative to the housing 20. The bearing axis 2-2 has moved to about the other side of the rotary member 35 along with the arcuate gear member 95. The bearing center axis 2-2 thus orbits the rotary axis 1-1 at a distance, that distance corresponding to the stroke length of the spindle 25.

Figure 7:
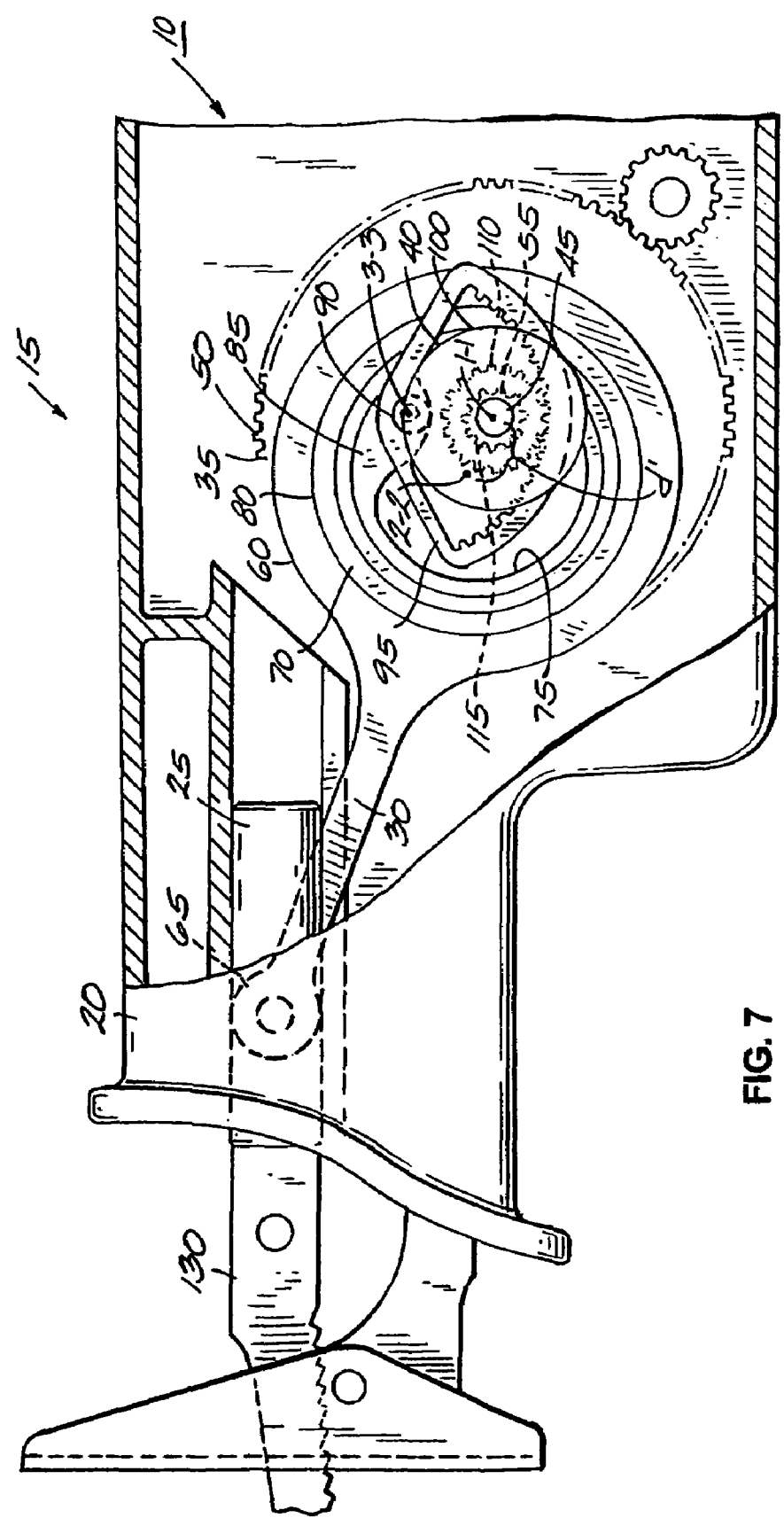
FIG. 7 is a partial cross-sectional side view of the reciprocating saw shown in FIG. 2 and configured for an intermediate stroke length with the spindle and the saw blade in the forward position.
Figure 8:
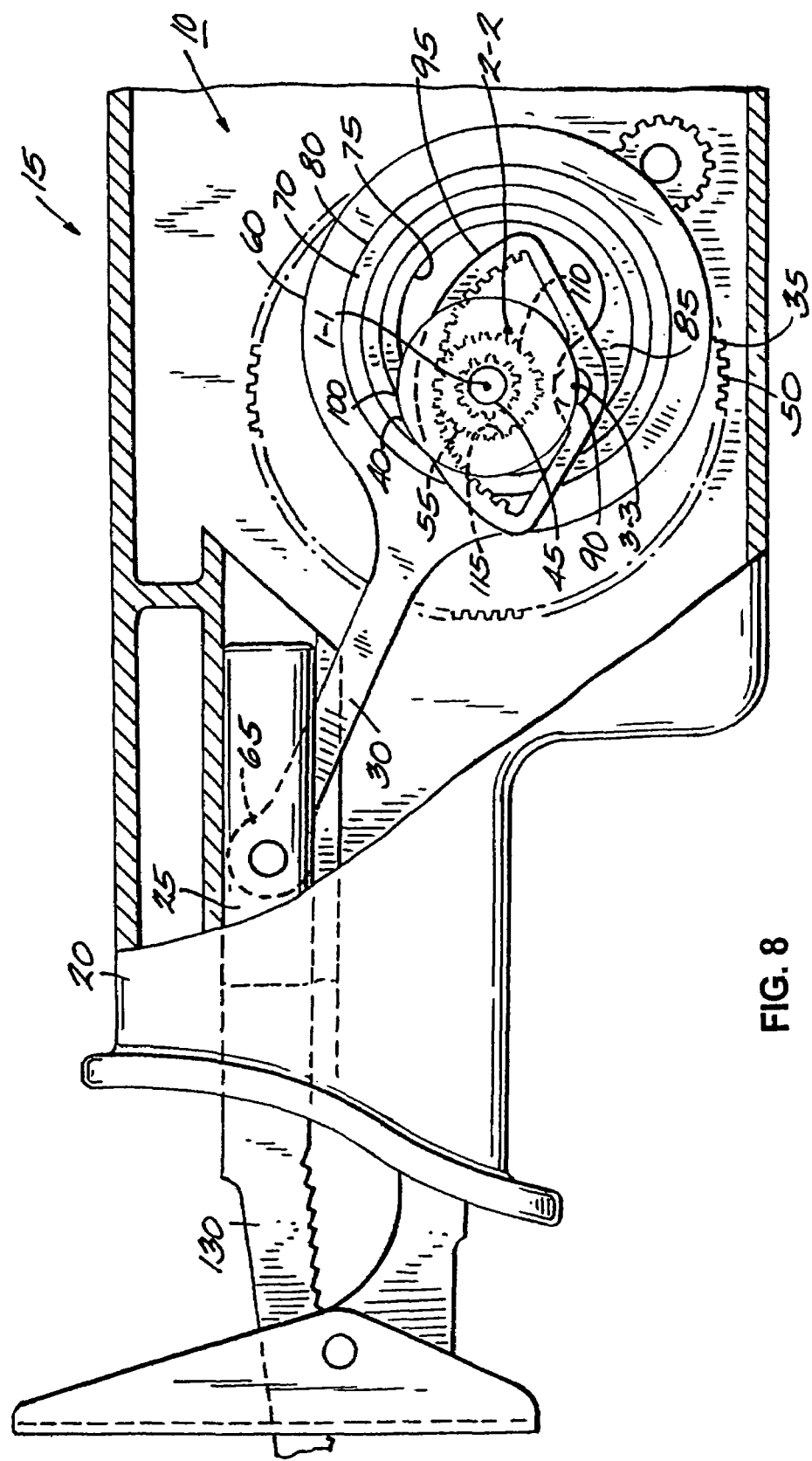
FIG. 8 is a partial cross-sectional side view of the reciprocating saw shown in FIG. 2 and configured as shown in FIG. 6 with the spindle and the saw blade in the rearward position.

FIGS. 7 and 8 illustrate the mechanism 10 adjusted for a stroke length between the minimum and maximum stroke lengths. The distance between the eccentric axis 3-3 and the rotary axis 1-1 remains constant, while the distance between the bearing center axis 2-2 and the rotary axis 1-1 is relatively reduced (when compared to that of FIGS. 2 and 3). The bearing center axis 2-2 thus moves around the rotary axis 1-1 along a tighter orbit resulting in a relatively shorter stroke length than that shown in FIGS. 2 and 3.

Referring to FIG. 8, the configuration of FIG. 7 is shown following about a one half revolution of the rotary member 35 about the rotary axis 1-1. Like the configuration in FIGS. 2 and 3, the relationship between the rotary member 35, the adjusting member 40, and the bearing inner race 75 has remained substantially constant. The relationship between the arm member 30 and the housing 20 also remains substantially unchanged with the exception of the reciprocating stroke at the spindle end 65 of the arm member 30.

Figure 6:
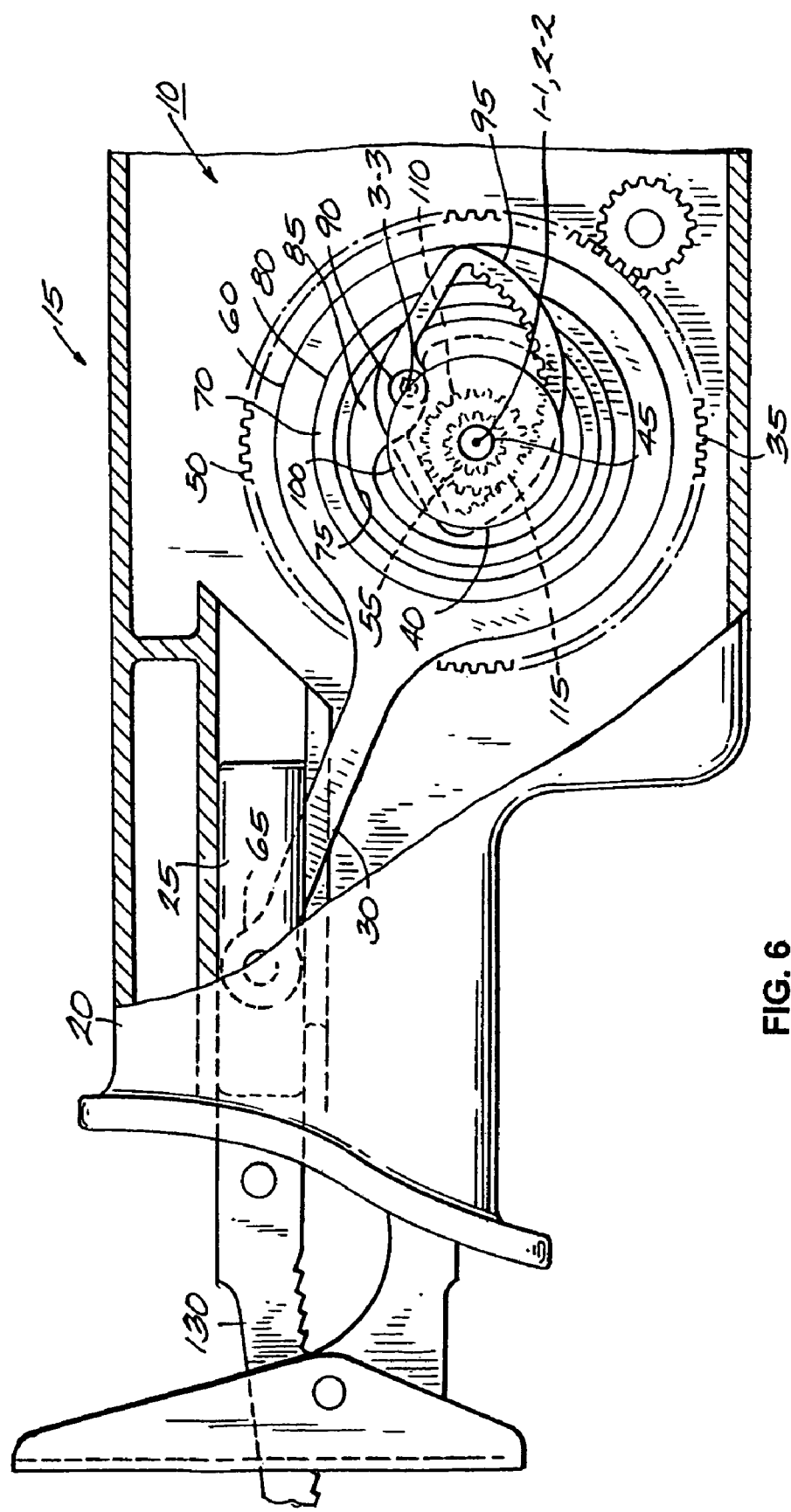
FIG. 6 is a partial cross-sectional side view of the reciprocating saw shown in FIG. 2 and configured for a minimum stroke length.

FIG. 6 illustrates the mechanism 10 in a "minimum" stroke configuration. Again, the eccentric axis 3-3 is disposed a fixed distance from the rotary axis 1-1. Unlike the configurations of FIGS. 2-3 and 7-8, the bearing center axis 2-2 is substantially coincident with the rotary axis 1-1, thus resulting in a minimum (i.e., zero) length stroke. Rotation of the rotary member 35 results in a corresponding rotation of the bearing inner race 75 about the bearing center axis 2-2. There is no corresponding motion of the arm member 30 and thus no stroke of the spindle 25.

An indicator assembly (not shown) may be provided to indicate to the user the selected stroke length of the spindle 25. The indicator assembly may include a first indicator member (not shown) provide by, for example, the knob member 100 and at least one second indicator member (not shown) provided by, for example, a portion of the housing 20 adjacent to the knob member 100. Alignment of the first indicator member with a second indicator member may indicate a first stroke length, and alignment of the first indicator member with another second indicator member (or mis-alignment of the first indicator member and the first-mentioned second indicator member) may indicate a second stroke length.

A detent arrangement (not shown) may be provided to easily position the knob member 100 in a position corresponding to a selected stroke length. Such a detent arrangement may include a first detent member (not shown) provided by, for example, the knob member 100 and at least one second detent member (not shown) provided by, for example, a portion of the housing 20 adjacent to the knob member 100. Positioning of the first detent member in a second detent member may correspond to a first stroke length, and positioning of the first indicator member in another second indicator member may correspond to a second stroke length.

FIGS. 9-15 illustrate an alternate construction of the mechanism 10' for producing an adjustable stroke length reciprocating motion in a reciprocating device or a power tool, such as a reciprocating saw 15'. The mechanism 10' includes substantially the same arrangement as the mechanism 10 illustrated in FIGS. 1-8. In the illustrated construction and in some aspects, the mechanism 10' also includes a counterweight assembly 135.

As with the construction of FIGS. 1-8, the mechanism 10' is supported by the housing 20 and includes a spindle 25, an adjusting member 40, a rotary member 35, and an arm member 30. The components of the mechanism 10' are assembled together and function in much the same manner as was described above.

Figure 12:
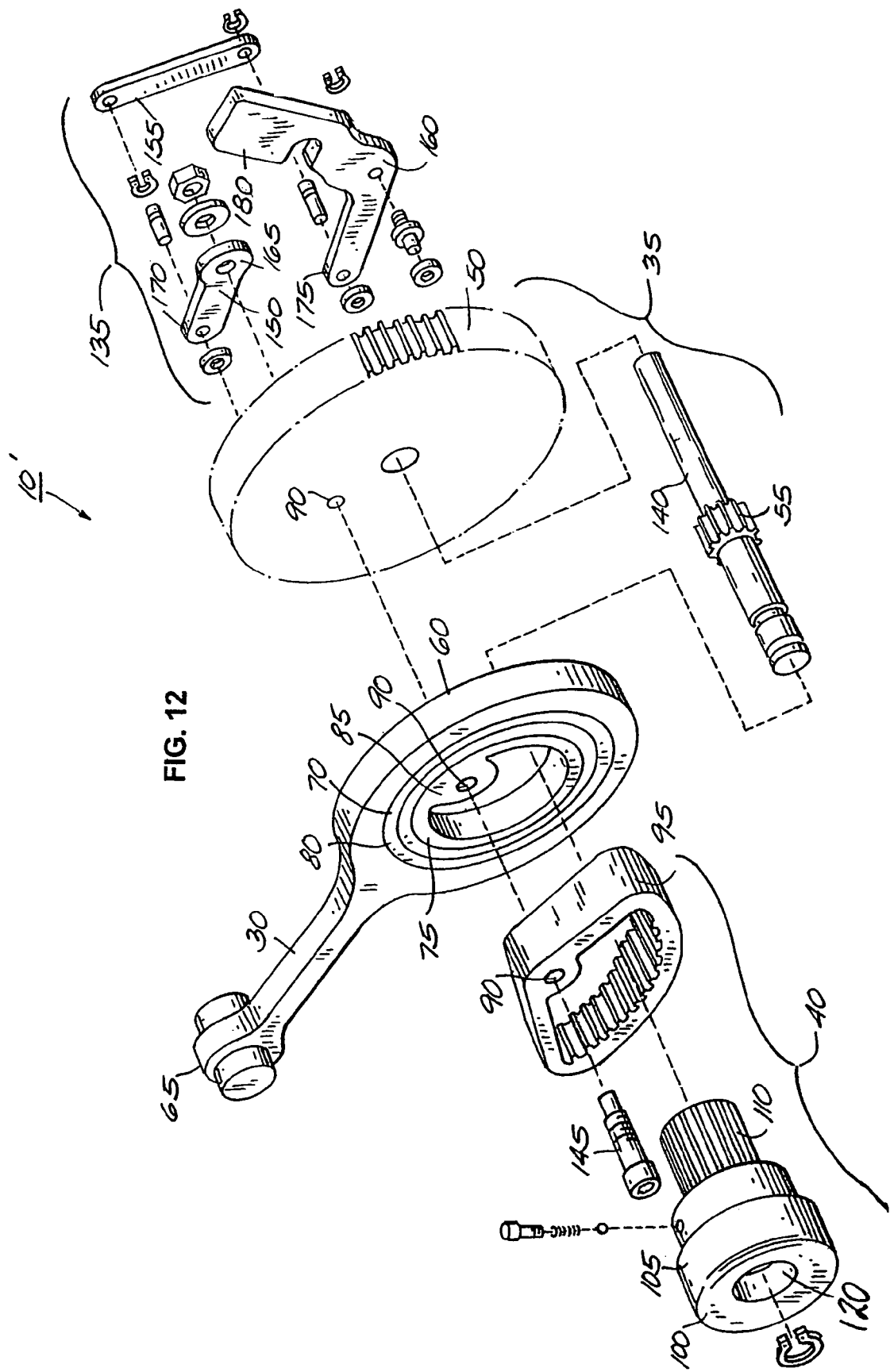
FIG. 12 is an exploded perspective view of the portion of the reciprocating saw shown in FIG. 11.

In the alternate construction of the mechanism 10', the drive shaft 140 of the rotary member 35, best illustrated in FIG. 12, is longer to accommodate the components of the counterweight assembly 135. The drive shaft 140 supports the adjusting gear 55 and the drive gear 50, however the space between the drive gear 50 and the housing 20 is larger. The longer drive shaft 140 allows the housing 20 to provide support to the rotary member 35, while spacing the drive gear 50 far enough from the housing 20 to allow free rotation of the counterweight assembly 135 therebetween.

In addition, a longer screw 145 is used, allowing the screw 145 to pass through the drive gear 50 so that it can be connected to the counterweight assembly 135. The screw 145 attaches the arcuate gear 95 to the bearing inner race 75 in a manner that maintains a substantially fixed relationship between the two components. The screw 145 extends along the eccentric axis 3-3 and through the drive gear 50 so that the attached arcuate gear 95 and inner race 75 are free to rotate about the eccentric axis 3-3 and are prevented from translating. The screw 145 also connects to the counterweight assembly 135 and moves the counterweight assembly 135 in response to movement of the arcuate member 95.

In the illustrated construction, the counterweight assembly 135 includes a crank arm 150, a link arm 155, and a weight arm 160. The crank arm 150 has two ends, a pivot end 165, and a link end 170. The pivot end 165 attaches to the end of the screw 145 that extends beyond the drive gear 50 such that the crank arm 150 maintains a fixed relationship with the arcuate gear 95. Rotation of the arcuate gear 95 produces a corresponding rotation of the crank arm 150 about the eccentric axis 3-3.

The link arm 155 includes two connection ends, the first being pivotally connected to the crank arm 150 at the link end 170, and the second being pivotally connected to the weight arm 160. The weight arm 160 is pinned to the drive gear 50 near the center of the arm 160 to define two ends, a crank end 175 and a mass end 180. The crank end 175 of the weight arm 160 pivotally connects to the link end 170, while the mass end 180 of the weight arm 160 is free to move in response to movement of the arcuate gear 95. The crank arm 150, link arm 155 and weight arm 160 are sized and arranged so that a force of the mechanism 10' remains substantially balanced in relation to the rotary axis 1-1 regardless of the stroke length.

Figure 9:
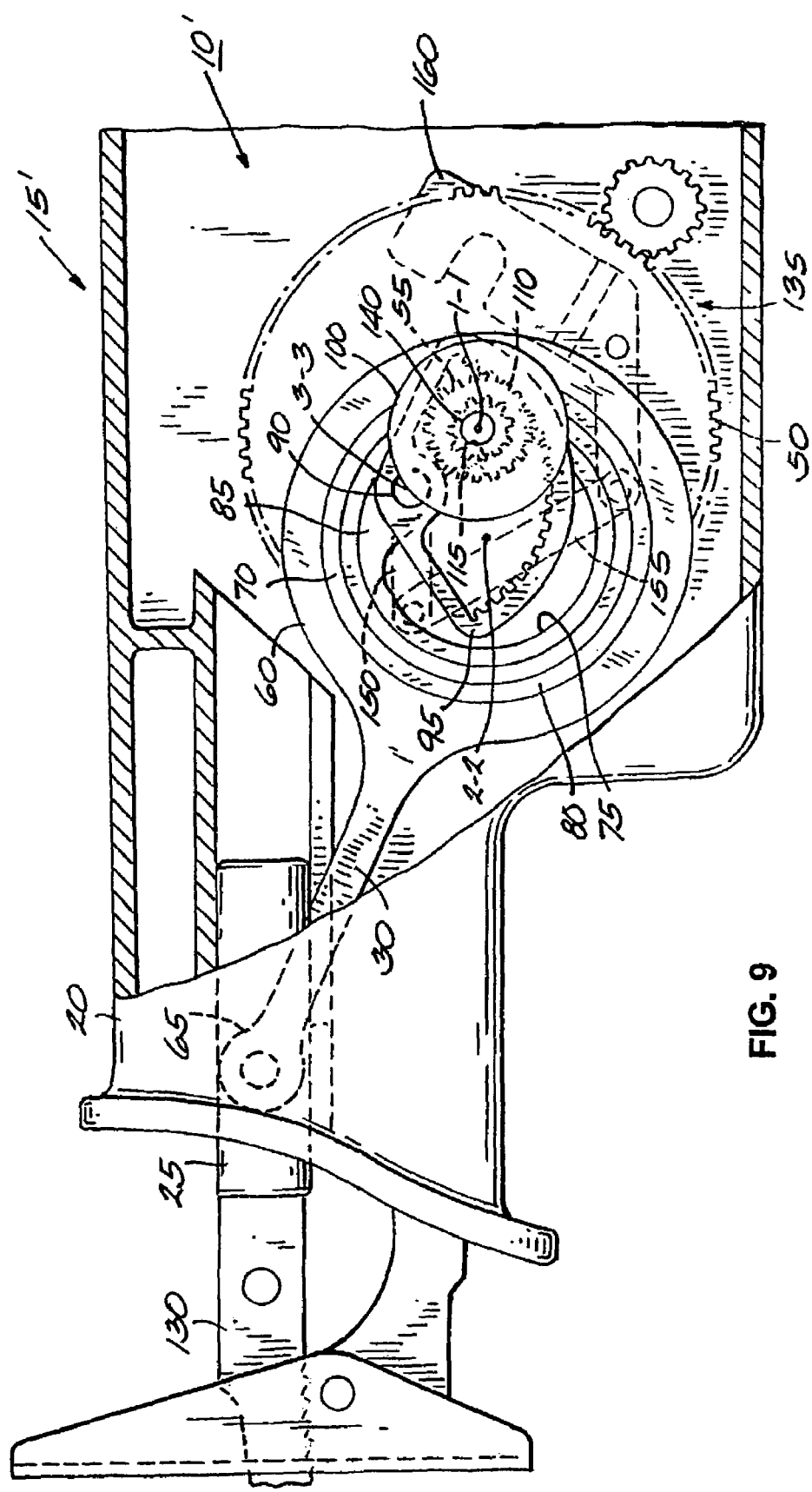
FIG. 9 is a partial cross-sectional side view of a first alternative construction of a reciprocating saw and illustrated configured for a maximum stroke length with the spindle and the saw blade in the forward position.
Figure 10:
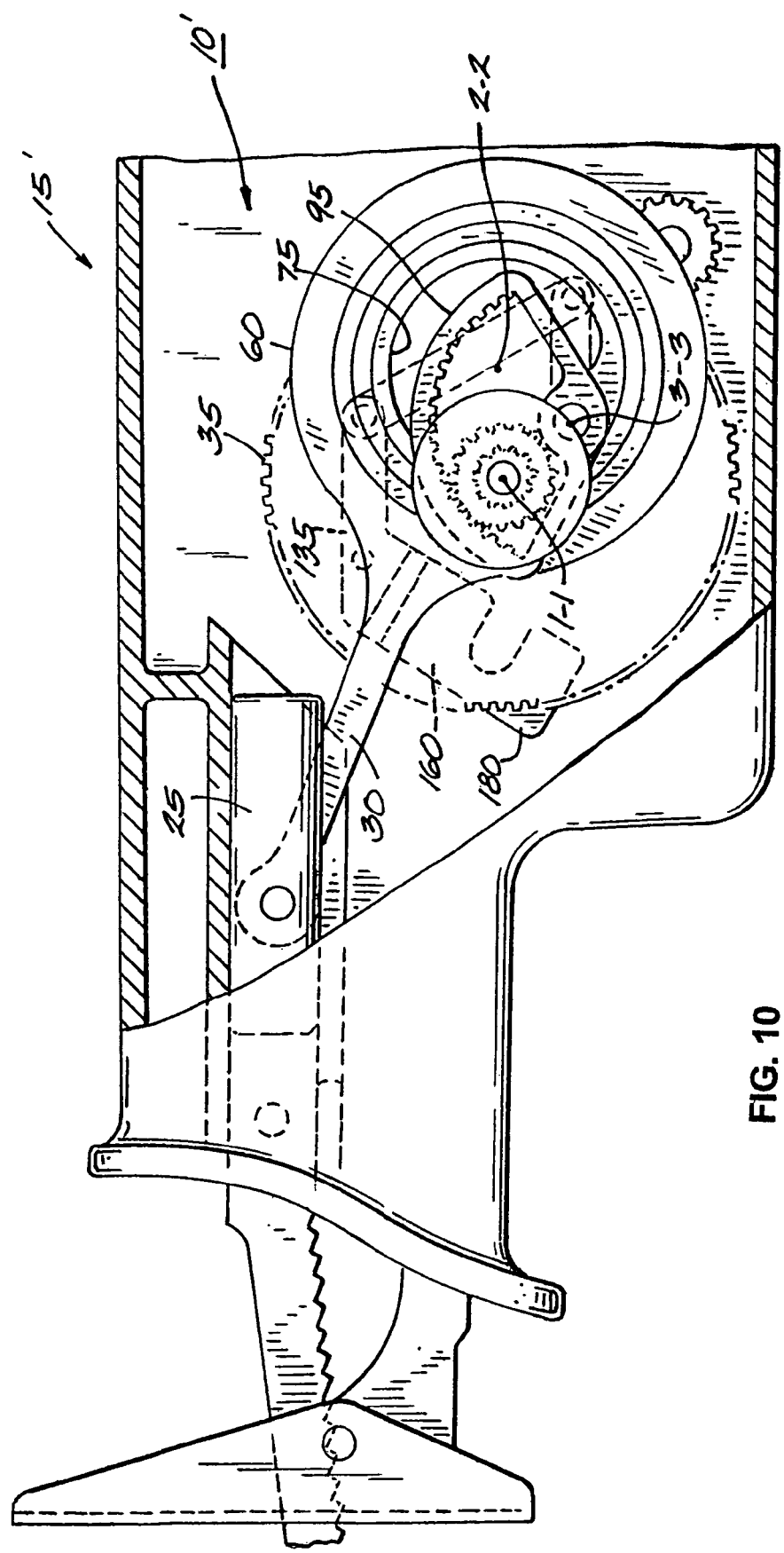
FIG. 10 is a partial cross-sectional side view of the reciprocating saw shown in FIG. 9 and configured as shown in FIG. 9 with the spindle and the saw blade in the rearward position.
Figure 11:
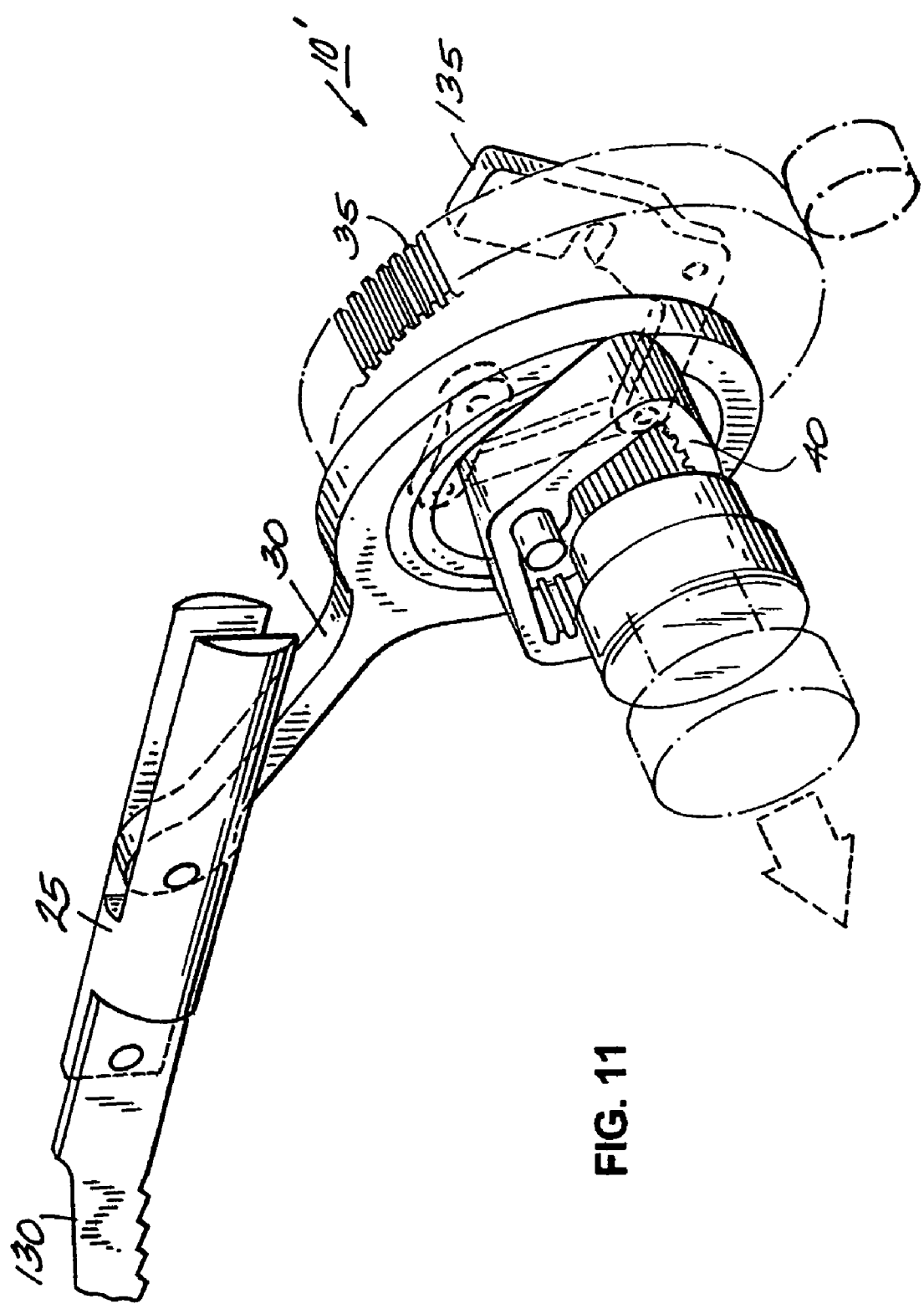
FIG. 11 is a perspective view of a portion of the reciprocating saw shown in FIG. 9.

Referring to FIGS. 9 and 10, the counterbalanced construction is shown configured for a "maximum" stroke length. FIG. 9 illustrates the mechanism 10' with the spindle 25 and the saw blade 130 in the maximum forward position of the stroke. In this position, the arcuate gear member 95 is shifted to the side of the rotary member 35 nearest the spindle 25. The arm member 30 is also shifted substantially toward the spindle 25. The center of mass of the drive end 60 of the arm member 30 is approximately located on the bearing center axis 2-2. The bearing center axis 2-2 and the arm member center of mass orbit the rotary axis 1-1 during operation, thus producing an imbalance force.

Compounding the imbalance at longer stroke lengths is the position of the arcuate gear 95. The center of mass of the arcuate gear member 95 is shifted in the same direction as the center of mass of the arm member 30 increasing the imbalance. To counteract the imbalance, the mass end 180 of the weight arm 160 is extended in substantially the opposite direction to produce a substantially equal but opposite counterbalancing force during rotation.

FIG. 10 shows the configuration of FIG. 9 following about a one-half revolution of the rotary member 35. The orientation between the arcuate gear 95, the bearing inner race 75, and the counterweight assembly 135 has remained constant, thus maintaining the substantially balanced relationship.

Figure 14:
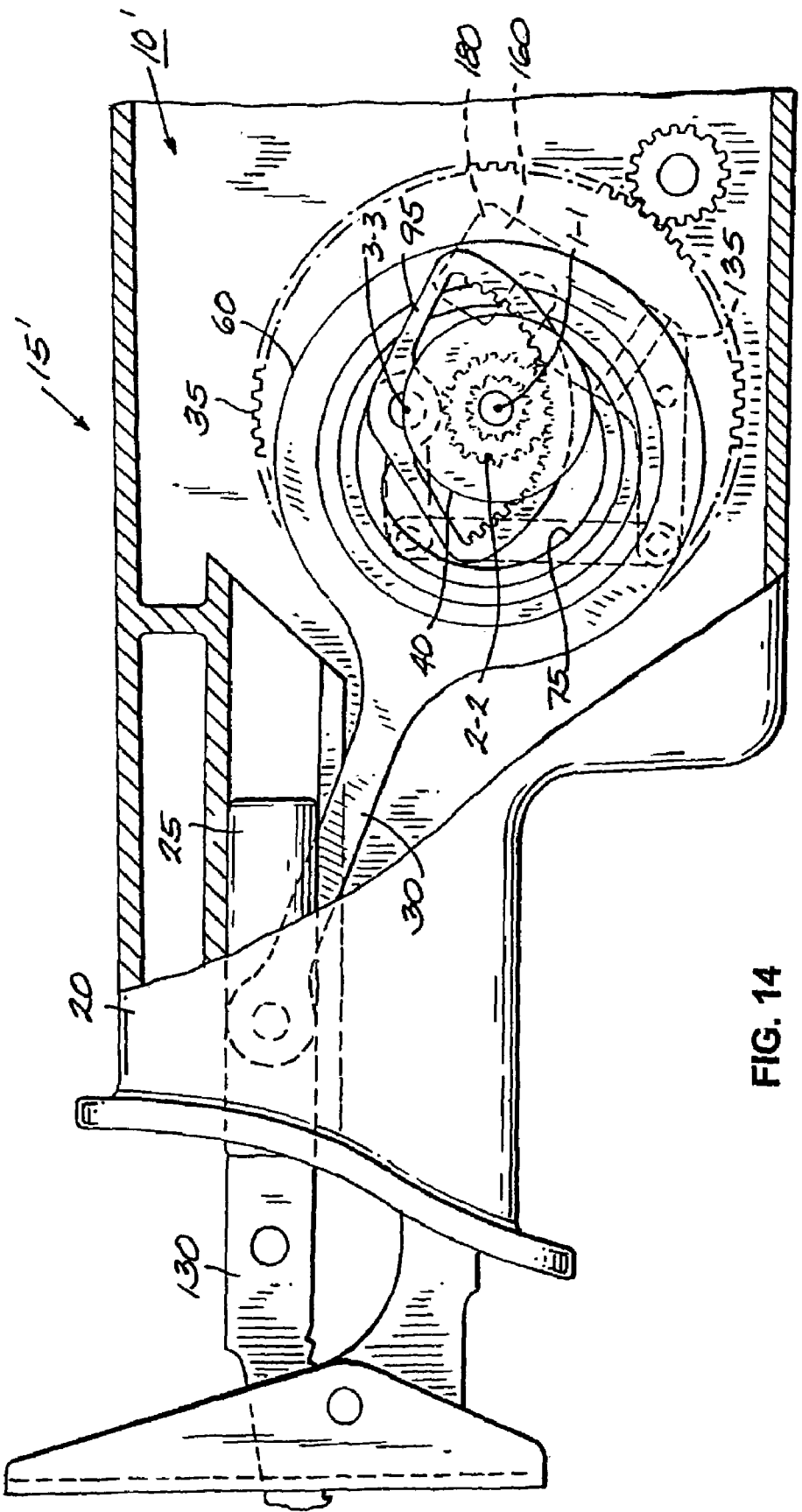
FIG. 14 is a partial cross-sectional side view of the reciprocating saw shown in FIG. 9 and configured for an intermediate stroke length with the spindle and the saw blade in the forward position.

Referring next to FIG. 14, the mechanism 10' is configured to produce a stroke length of the spindle 25 between the minimum and maximum stroke length. In this configuration, any imbalance produced by the arcuate gear member 95 becomes negligible. However, the center of mass of the drive end 60 of the arm member 30 is still offset from the rotary axis 1-1. This offset results in a significant imbalance during operation. The mass end 180 of the weight arm 160 is offset in the opposite direction to counteract the forces generated by the arm member 30 during rotation.

Comparing FIG. 9 to FIG. 14, the mass end 180 is offset a relatively smaller amount when the stroke length is less than the maximum. The counterweight assembly 135 moves in conjunction with the adjusting member 40 to substantially cancel a force generated by component imbalance during rotation at any stroke length.

Figure 15:
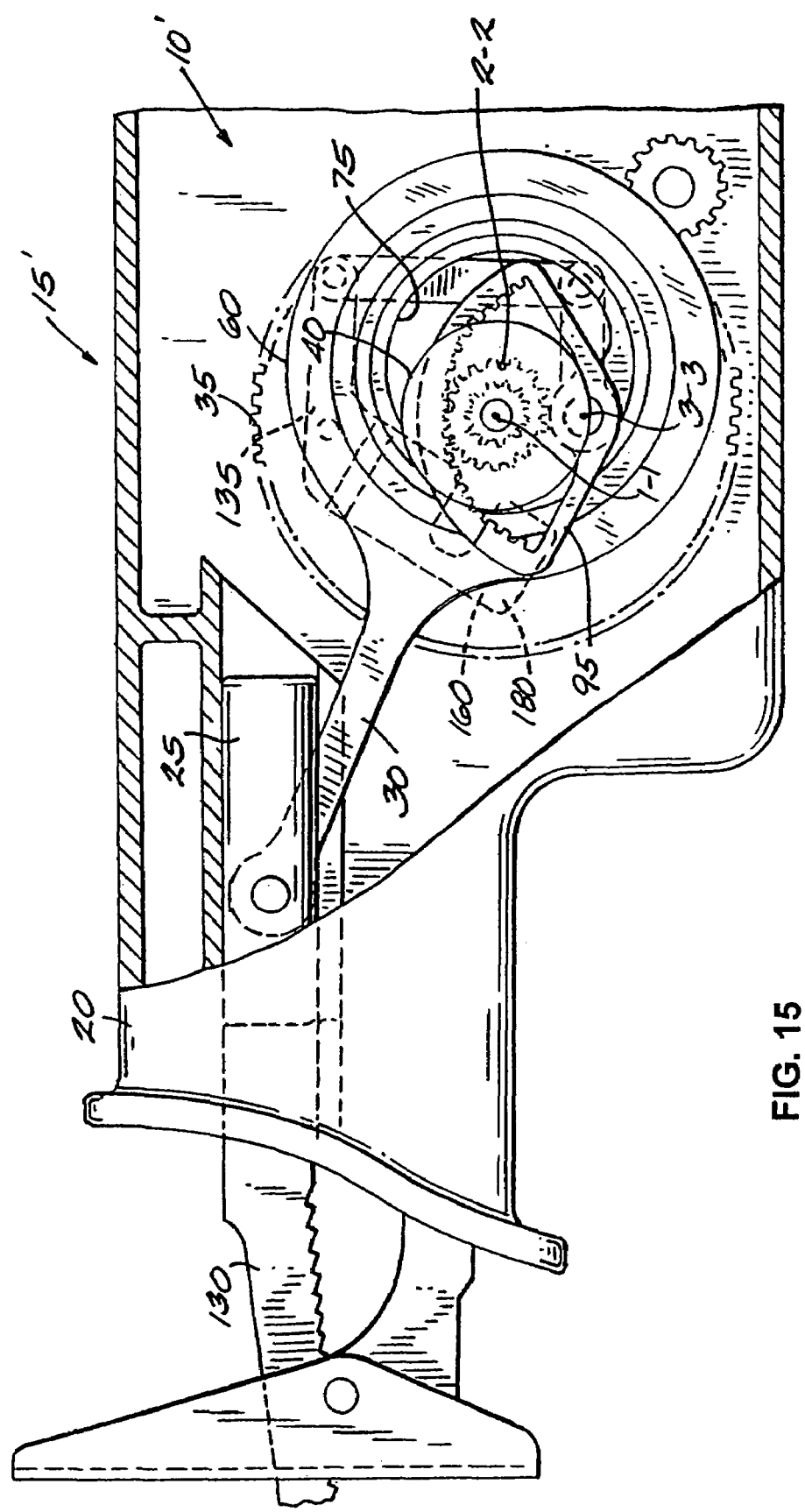
FIG. 15 is a partial cross-sectional side view of the reciprocating saw configured as shown in FIG. 14 with the spindle and the saw blade in the rearward position.

FIG. 15 shows the configuration of FIG. 14 following about a one-half revolution of the rotary member 35. The orientation between the arcuate gear 95, the bearing inner race 75, and the counterweight assembly 135 has remained constant, thus maintaining the substantially balanced relationship.

Figure 13:
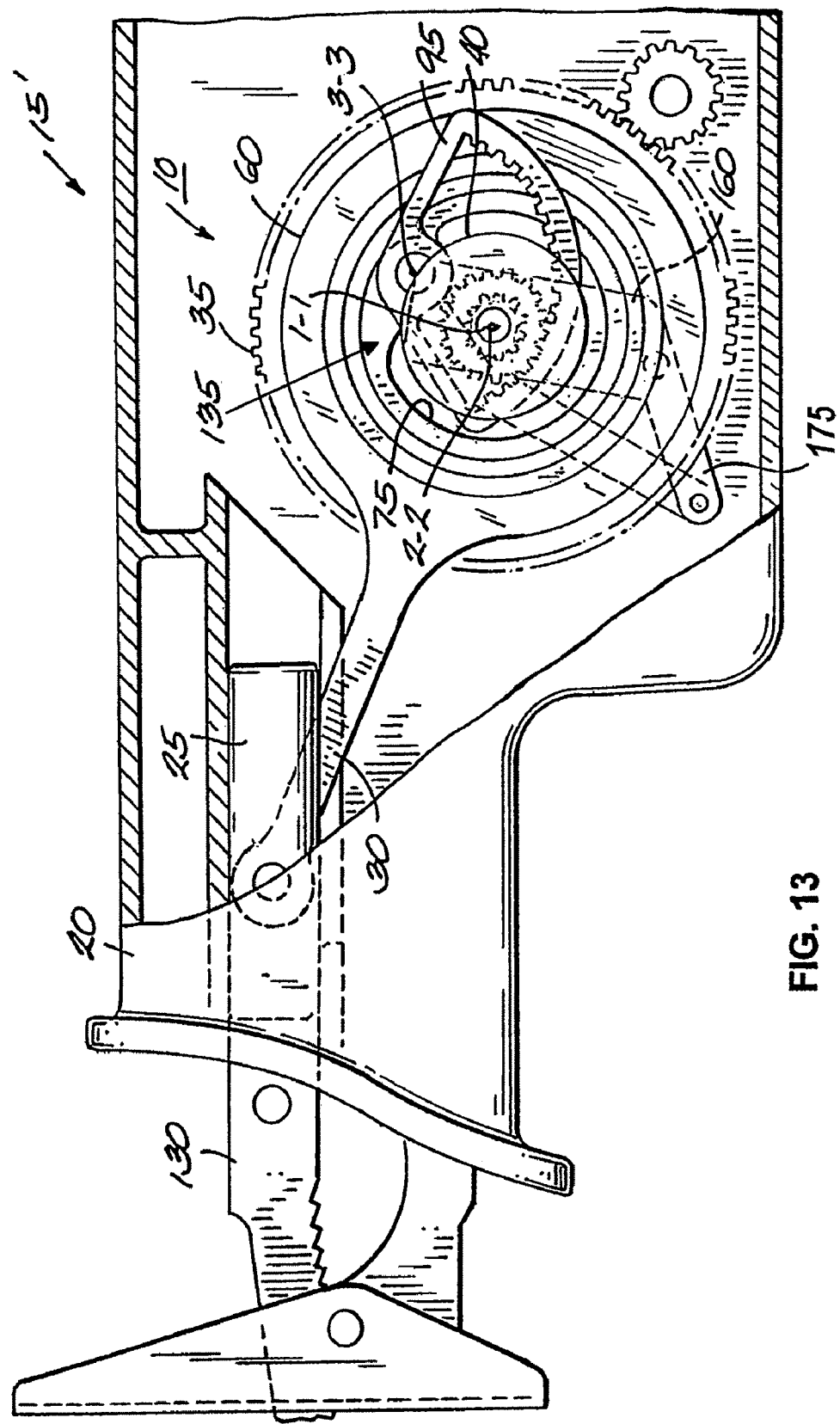
FIG. 13 is a partial cross-sectional side view of the reciprocating saw shown in FIG. 9 configured for a minimum stroke length.

FIG. 13 illustrates the mechanism 10' configured for a "minimum" stroke length. Here, the bearing central axis 2-2 and corresponding drive end 60 center of mass coincide with the rotary axis 1-1 and thus produce a nearly balanced motion. The mass end 180 of the weight arm 160 retracts so that the counterbalancing force generated is nearly zero to maintain the substantially balanced relationship.

With the exception of the counterweight assembly 135, the construction of the mechanism 10' illustrated in FIGS. 9-15 operates in substantially the same manner as the construction of the mechanism 10 illustrated in FIGS. 1-8. In the illustrated construction and in some aspects, the mechanism 10' provides a counterweight assembly 135 in which the counterbalance force is adjustable. In the illustrated construction and in some aspects, the mechanism 10' provides a counterweight assembly 135 in which a movement of the counterweight assembly 135 is adjustable. In the illustrated construction and in some aspects, the mechanism 10' provides a counterweight assembly 135 in which a range of movement of the counterweight assembly 135 is adjustable. In the illustrated construction and in some aspects, the mechanism 10' provides a counterweight assembly 135 in which a stroke length of the counterweight assembly 135 is adjustable. In the illustrated construction and in some aspects, the mechanism 10' provides an adjustable stroke length for the spindle 25 and a counterweight assembly 135 in which the counterbalance force is adjustable to counterbalance a force of the mechanism 10' in one or more adjusted stroke lengths of the spindle 25.

It should be understood that, in some aspects and in some constructions (not shown), the mechanism 10' may include only an adjustable counterweight assembly (similar to the counterweight assembly 135). In such constructions and for such aspects, the counterweight assembly alone (e.g., the resulting counterbalance force, movement, range of movement, stroke length alone of the counterweight assembly) may be adjustable. In such constructions and for such aspects, the stroke length of the spindle 25 may not be adjustable.

It should also be understood that, in some aspects and in some constructions (not shown), the mechanism 10' may include an independently adjustable counterweight assembly (similar to the counterweight assembly 135). In such constructions and for such aspects, the counterweight assembly alone (e.g., the resulting counterbalance force, movement, range of movement, stroke length alone of the counterweight assembly) may be adjustable independently of any adjustment of the stroke length of the spindle 25.

In addition, it should be understood that, in some aspects and in some constructions (not shown), another counterweight assembly may be provided, and such another counterweight assembly may or may not be adjustable. For example, such another counterweight assembly may include a counterweight member reciprocating along the axis of the spindle or along an axis parallel to the spindle. Such a counterweight member may be driven in a manner similar but opposite to the spindle 25 by, for example, an arm member (similar to the arm member 30), and the counterweight assembly may be adjustable in a manner similar to the spindle 25.

The mechanism 10' may include an indicator assembly (not shown) to indicate the selected stroke length of the spindle 25 or the configuration of the counterweight assembly 135 (e.g., the resulting counterbalance force, movement, range of movement, stroke length, etc. of the counterweight assembly 135). The mechanism 10' may also include a detent arrangement (not shown) to easily position the knob member 100 in a position corresponding to a selected configuration (e.g., stroke length of the spindle 25 or the configuration of the counterweight assembly 135 (e.g., the resulting counterbalance force, movement, range of movement, stroke length, etc. of the counterweight assembly 135)).

Assembly of the construction of FIGS. 9-15 is very similar to the assembly of the construction of FIGS. 1-8 previously described above.

In the illustrated construction, before assembling any components into the housing 20, the counterweight assembly 135 is pre-assembled. The link arm 155 connects at one end to the crank arm 150 and at the other end to the weight arm 160. The link arm 155 connections are pivotal to allow the link arm 155 to pivot relative to both the weight arm 160 and the crank arm 150. Next, the weight arm 160 is pivotally attached to the drive gear 50 so that the weight arm 160 remains free to pivot about the attachment point. The adjusting gear 55 along with the drive gear/counterweight assembly 50/135 connect to the drive shaft 140.

Assembly of the components into the housing 20 begins with the insertion of the drive shaft end into a support provided within the housing 20. The support (not shown) positions the drive shaft 140 so that the counterweight assembly 135 is free to rotate without contacting the housing 20 or other components and may include one or more bearing members (not shown) to reduce friction between the drive shaft 140 and the housing 20 during rotation of the drive shaft 140. Next, the arm member 30, including the bearing 70, is positioned. The spindle end 65 connects to the spindle 25, which is supported by the housing 20 in a manner that allows only reciprocating motion. The drive end 60 passes over the drive shaft 140 allowing the rotary axis 1-1 to pass within the opening defined by the bearing inner race 75.

The arcuate gear member 95 is positioned so that its center axis is coincident with the eccentric axis 3-3 and the bearing center axis 2-2 passes through the opening defined by the arcuate gear 95. The screw 145 connects the arcuate gear 95 to the bearing inner race 75, extends through the drive gear 50, and engages the crank arm 150 of the counterweight assembly 135 to fix the relationship between the bearing inner race 75, arcuate gear 95, and crank arm 150. The screw 145, by passing through the drive gear 50, also fixes the position of the eccentric axis 3-3 relative to the drive gear 50, thereby allowing rotation but no translation.

The knob member 100 slides over the drive shaft 140, engages the arcuate gear member 95, and selectively engages the adjusting gear 55. A snap ring fits on the drive shaft 140 to confine the knob member 100 to the shaft 140 and complete the assembly.

FIGS. 16A-16C, 17A-17C, 18A-18C and 19A-19C illustrate another alternate construction of a mechanism 10A for producing an adjustable stroke length reciprocating motion in a reciprocating device or a power tool, such as a reciprocating saw 15A.

Referring to FIGS. 16-17, the saw 15A includes a housing 20 formed to support a spindle 25 for reciprocating motion and a rotary member 35 for rotary motion. The spindle 25 extends out one end of the housing 20 and is adapted to support a saw blade or other reciprocating tool at one end. A drive member, such as an electric motor, operates to produce a reciprocating motion at the spindle 25.

An arm member 30A connects to the spindle 25 at the end opposite the blade or tool. The arm member 30A transfers the rotary motion of the rotary member 35 into reciprocating motion of the spindle 25. The second end of the arm member 30A connects to an adjusting member 40A along a movable eccentric axis E-E.

The rotary member 35 is supported by the housing 20 and driven by an electric motor or other drive device. The rotary member 35 rotates about a rotary axis R-R that is fixed relative to the housing 20. Generally, a gear directly or indirectly driven by a motor drives the rotary member 35. The adjusting member 40A interconnects the arm member 30A and the rotary member 35 to facilitate the conversion of rotary motion to linear motion, while allowing the user to vary the reciprocating stroke length of the spindle 25.

In the illustrated construction, the adjusting member 40A includes a triangular plate 200 that defines three axis, one near each apex. The first axis is the eccentric axis E-E. The arm member 30A connects to the triangular plate 200 along the eccentric axis E-E such that the triangular plate 200 translates the rotational motion of the rotary member 35 to reciprocating motion at the spindle 25.

The second apex pivotally connects to the rotary member 35 along the second axis S-S. The second axis S-S is spaced a distance from the rotary axis R-R such that rotation of the rotary member 35 causes the second axis S-S to orbit the rotary axis R-R. A first link member 205 pivotally connects to the triangular plate 200 along the third axis T-T. The first end of the link 205 connects to the triangular plate 200 and the second end movably connects to an adjusting knob 210.

While a triangular plate 200 is illustrated in FIGS. 16-19, other shapes or combinations of components will function so long as, in the illustrated construction, at least three axes can be provided. For example, a generally circular plate (not shown) or a generally square plate (not shown) would allow for the proper positioning of three axes.

The adjusting knob 210 of FIG. 16 includes an extension 215 that connects to the second end of the link member 205. The knob position is fixed relative to the housing 20. However, the knob 210 is selectively free to rotate. Rotation of the knob 210 changes the position of the extension 215 relative to the housing 20 and moves the second end of the link member 205.

In operation, the knob member 210 is positioned to achieve the desired reciprocating stroke length of the spindle 25. The knob position locks the position of the second end of the link member 205 relative to the housing 20 such that the first end of the link member 205 is free to pivot along an arc having its center at the end of the link 205. The first end of the link member 205, which attaches to the triangular plate 200 through the third axis T-T, travels along a portion of a circle having a radius defined by the length of the link member 205 and a center point defined by the position of the knob 210.

The motor operates to rotate the rotary member 35 and the triangular plate 200 that is attached to the rotary member 35. The second axis S-S of the triangular plate 200 orbits the rotary axis R-R in response to rotation of the rotary member 35. The movement of the second axis S-S (orbiting around the rotary axis R-R) combined with the restrained movement of the third axis T-T (along a portion of a circle) results in the desired reciprocating motion of the eccentric axis E-E. The eccentric axis E-E reciprocates forwardly and rearwardly as well as translates upwardly and downwardly. Guides 220 supporting the spindle 25 and/or guiding the arm member 30A produce the desired reciprocating motion at the spindle 25.

FIG. 16 illustrates the mechanism 10A configured for a "maximum" stroke length with the spindle 25 in the forward position. FIG. 17 illustrates the mechanism 10A configured as in FIG. 16 for the maximum stroke length with the spindle 25 in the rearward position. As can be seen, the adjustment knob 210 and the second end of the link member 205 remain fixed relative to the housing 20, while the triangular plate 200, arm member 30A, link member first end, and spindle 25 have moved relative to the housing 20 in response to rotation of the rotary member 35.

In the illustrated "maximum" stroke configuration, a relatively greater portion of the rotation of the rotary member 35 is converted to movement of the arm member 30A and of the spindle 25 along the spindle axis (i.e., a relatively longer stroke length). In comparison, in the illustrated configuration, a relatively lesser portion of the rotation of the rotary member 30A is converted to movement of the arm member 30A transverse to the axis of the spindle 25.

FIG. 18 illustrates the mechanism 10A configured for a "minimum" stroke length with the spindle 25 in the forward position. Comparing FIG. 18 to FIG. 16 illustrates the new position of the adjustment knob 210 and the second end of the link member 205 relative to the housing 20. FIG. 19 illustrates the saw 15A configured as shown in FIG. 18 with the spindle 25 in the retracted position. As in FIGS. 16 and 17, the adjustment knob 210 and second end of the link member 205 remain fixed relative to the housing 20, while the triangular plate 200, arm member 30A, link member first end, and spindle 25 have moved relative to the housing 20 in response to rotation of the rotary member 35.

In the illustrated "minimum" stroke configuration, a relatively lesser portion of the rotation of the rotary member 35 is converted to movement of the arm member 30A and of the spindle 25 along the spindle axis (i.e., a relatively shorter stroke length). In comparison, in the illustrated configuration, a relatively greater portion of the rotation of the rotary member 30A is converted to movement of the arm member 30A transverse to the axis of the spindle 25.

It should be understood that, in other constructions (not shown), the mechanism 10A may also include a counterweight assembly (not shown), and the counterweight assembly may or may not be adjustable. Also, in other constructions (not shown), the mechanism 10A may be used to adjust such a counterweight assembly rather than adjusting the stroke length of the spindle 25. In addition, in other constructions (not shown), the mechanism 10A may adjust the counterweight assembly and the stroke length of the spindle 25. Further, in other constructions (not shown), a separate adjusting assembly (not shown) may be provide to adjust the counterweight assembly.

The mechanism 10A may include an indicator assembly (not shown) to indicate the selected stroke length of the spindle 25 or the configuration of the counterweight assembly (e.g., the resulting counterbalance force, movement, range of movement, stroke length, etc. of the counterweight assembly), if provided. The mechanism 10A may also include a detent arrangement (not shown) to easily position the knob member 210 in a position corresponding to a selected configuration (e.g., stroke length of the spindle 25 or the configuration of the counterweight assembly (e.g., the resulting counterbalance force, movement, range of movement, stroke length, etc. of the counterweight assembly), if provided).

FIGS. 20-25 illustrate yet another construction of a mechanism 10B for producing an adjustable stroke length reciprocating motion in a reciprocating device or a power tool, such as a reciprocating saw 15B.

In the illustrated construction, a housing 20 supports a rotary element 35 for rotation and a spindle 25 for reciprocation. The rotary element 35 is a gear that is directly, or indirectly, driven by a motor or other rotating device. The rotary member 35 defines a rotary axis R-R that is fixed relative to the housing 20.

An eccentric axis E-E passes through the rotary member 35 at a distance from the rotary axis R-R such that rotation of the rotary member 35 moves the eccentric axis E-E along an orbital path around the rotary axis R-R. In the illustrated construction, a first link member 225 includes a first end 230 that pivotally connects to the rotary member 35 along the eccentric axis E-E such that the first end 230 orbits the rotary axis R-R in response to rotation of the rotary member 35. The second end 235 of the first link member 225 defines a junction 238.

An adjusting member 40B including a second link 240 having a first end 245 pivotally connects to the first link member 225 at the junction 238. A second end 250 of the second link 240 pivotally connects to an adjusting gear 255. The adjusting gear 255 is fixed relative to the housing 20 and rotatable about an adjusting axis A-A. Rotation of the gear 255 moves the second end 250 of the second link 240.

During operation, the adjusting gear 255 remains fixed as does the location of the second end 250 of the second link member 240. This constrains the movement of the first end 245 of the second link member 240, and the junction 238, to movement along a circular arc having a radius defined by the length of the second link member 240 and a center defined by the position of the second end 250 of the second link member 240.

Figure 20:
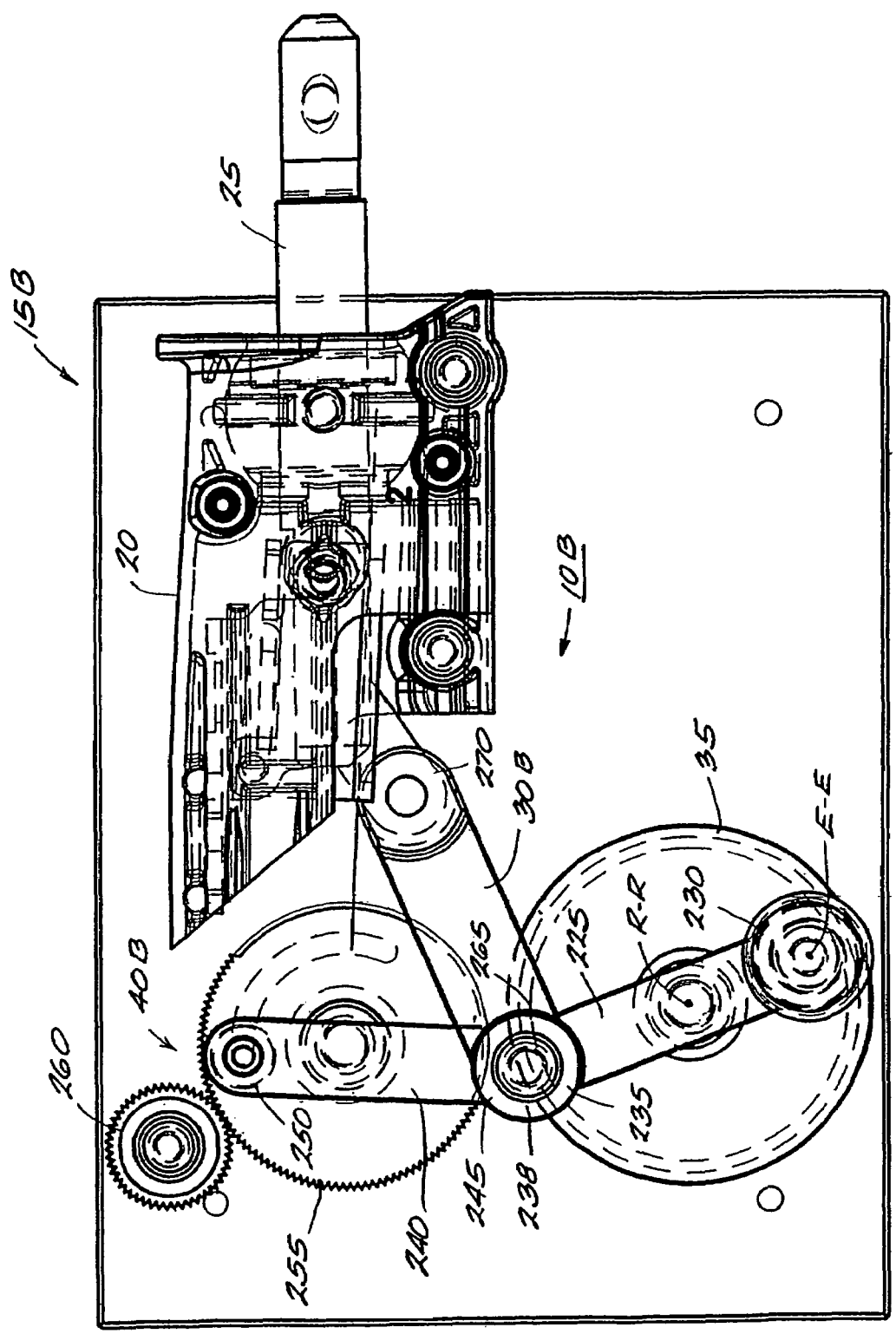
FIG. 20 is a side view of a third alternative construction of a reciprocating saw and illustrated configured for a maximum stroke length with the spindle in the forward position.

Completing the adjusting member 40B in the construction of FIG. 20 is a knob gear 260. The knob gear 260 engages the adjusting gear 255 such that rotation of the knob gear 260 rotates the adjusting gear 255. The knob gear 260 is on a shaft that is fixed relative to the housing 20 and extends beyond the housing 20 to support an adjusting knob or lever (not shown). Thus, the user can adjust the stroke length of the spindle 25 by moving the knob disposed outside of the housing 20.

An arm member 30B is also attached to the junction 238. A first end 265 of the arm member 30B is pivotally connected to the first end 245 of the second link member 240 and the second end 235 of the first link member 225 at the junction 238. Thus, the two link members 225, 240 and the arm member 30B are free to pivot relative to one another and move relative to the housing 20. A second end 270 of the arm member 30B pivotally connects to the first end of the spindle 25 and drives the spindle 25 in a reciprocating motion as described above.

In operation, the knob gear 260 is rotated until the adjusting gear 255 is in the position that produces the desired stroke length of the spindle 25. The rotary member 35 is rotated by a motor or engine such that the eccentric axis E-E and first end 230 of the first link member 225 orbit the rotary axis R-R. Because the position of the second end 250 of the second link member 240 is fixed, the junction 238 located at the second end 250 of the second link member 240 is constrained to travel along the circular arc defined by the second link member 240. Thus, the junction 238 reciprocates along a partial circular arc. The arm member 30B, attached at one end to the junction 238 and at the other end to the spindle 25, reciprocates in response to the rotation of the rotary member 35. The first end 265 of the arm member 30B follows the circular arc along with the junction 238, while the second end 270 follows the path defined for the spindle 25. Generally, this is a linear reciprocating path.

Figure 21:
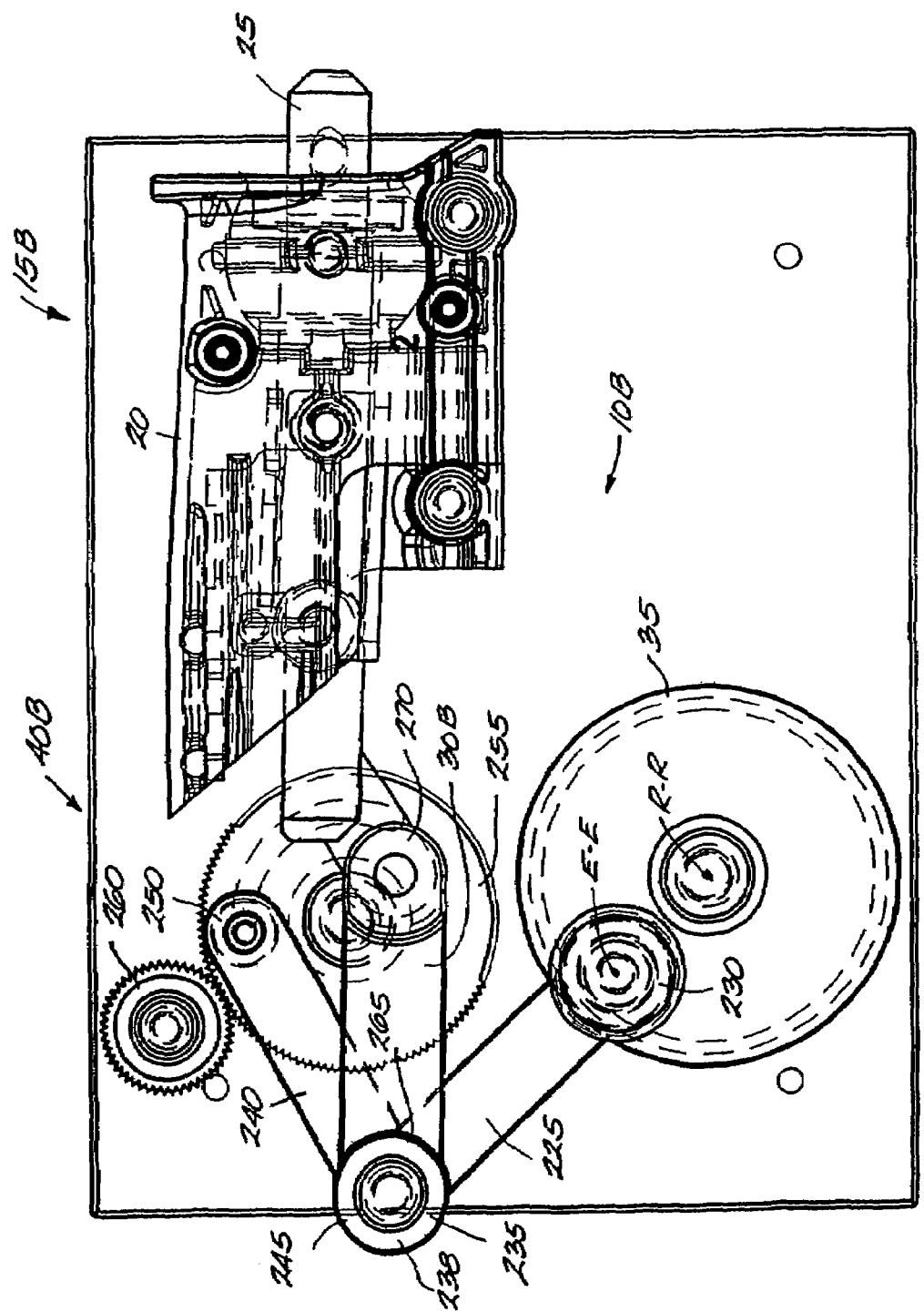
FIG. 21 is a side view of the reciprocating saw shown in FIG. 20 and configured as shown in FIG. 20 with the spindle in the rearward position.

FIG. 20 illustrates the mechanism 10B configured for a "maximum" stroke length with the spindle 25 fully extended. FIG. 21 illustrates the saw 15B configured as shown in FIG. 20 with the spindle 25 fully retracted. The second end 25 of the second link member 240 is fixed relative to the housing 20 and only allows the second link 240 to pivot. The first link member 225, arm member 30B, and junction 238 cooperate to convert the rotary motion of the rotary member 35 into reciprocating motion of the spindle 25.

Figure 22:
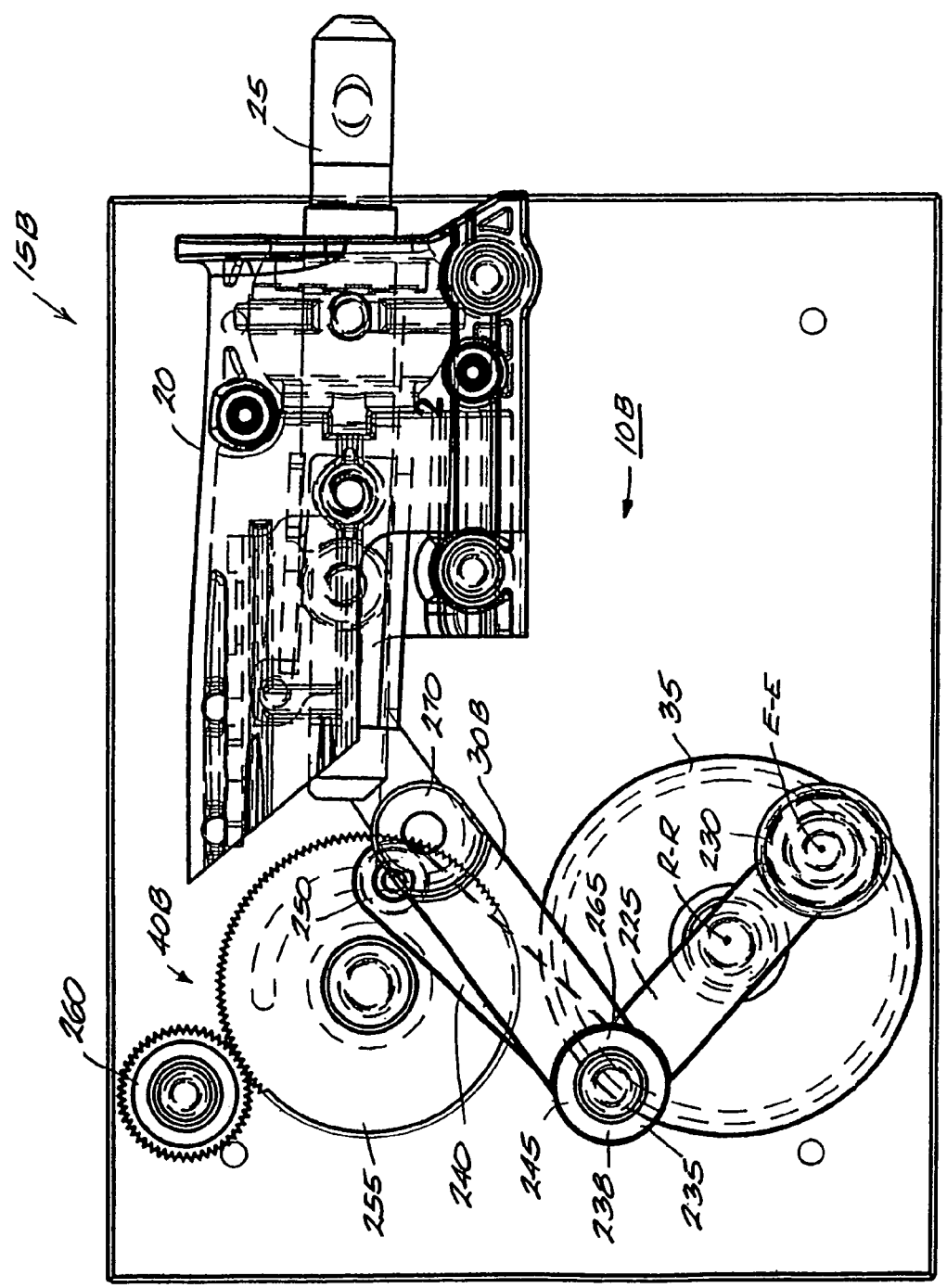
FIG. 22 is a side view of the reciprocating saw shown in FIG. 20 and configured for a minimum stroke length with the spindle in the forward position.
Figure 23:
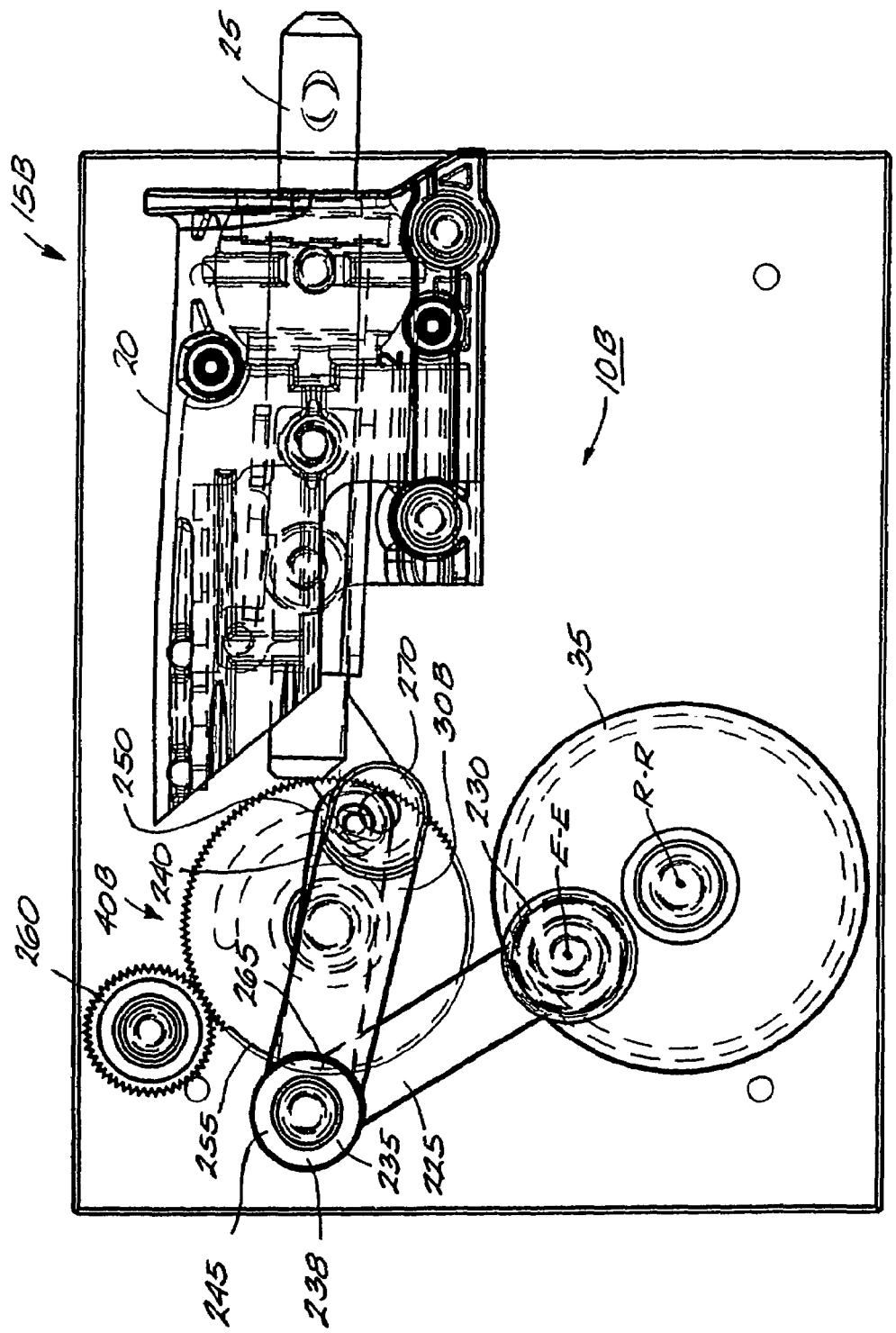
FIG. 23 is a side view of the reciprocating saw shown in FIG. 20 configured for a minimum stroke length with the spindle in the rearward position.

FIG. 22 illustrates the mechanism 10B configured for a "minimum" stroke length with the spindle 25 fully extended. FIG. 23 illustrates the saw 15B configured as shown in FIG. 22 with the spindle 25 fully retracted. Comparing FIG. 22 with FIG. 20 illustrates how the stroke length of the spindle 25 and of the saw 15B is changed. The adjusting gear 255 of FIG. 22 has been rotated to its first or, in the illustrated construction, extreme clockwise position to produce a minimum stroke length. In this configuration, the mechanism 10B operates in a manner similar to that described with respect to FIGS. 20 and 21.

Figure 24:
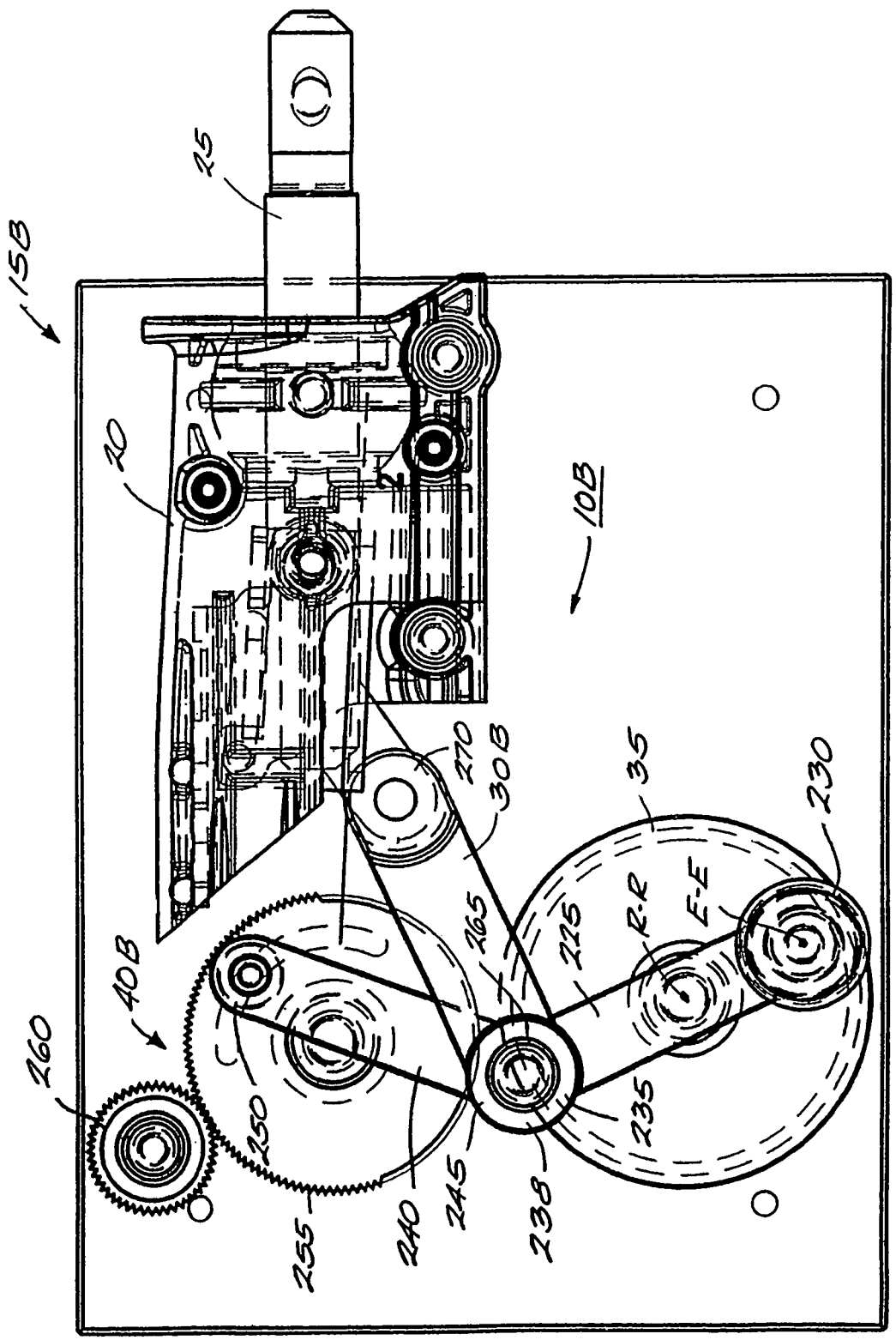
FIG. 24 is a side view of the reciprocating saw shown in FIG. 20 and configured for an intermediate stroke length with the spindle in the forward position.
Figure 25:
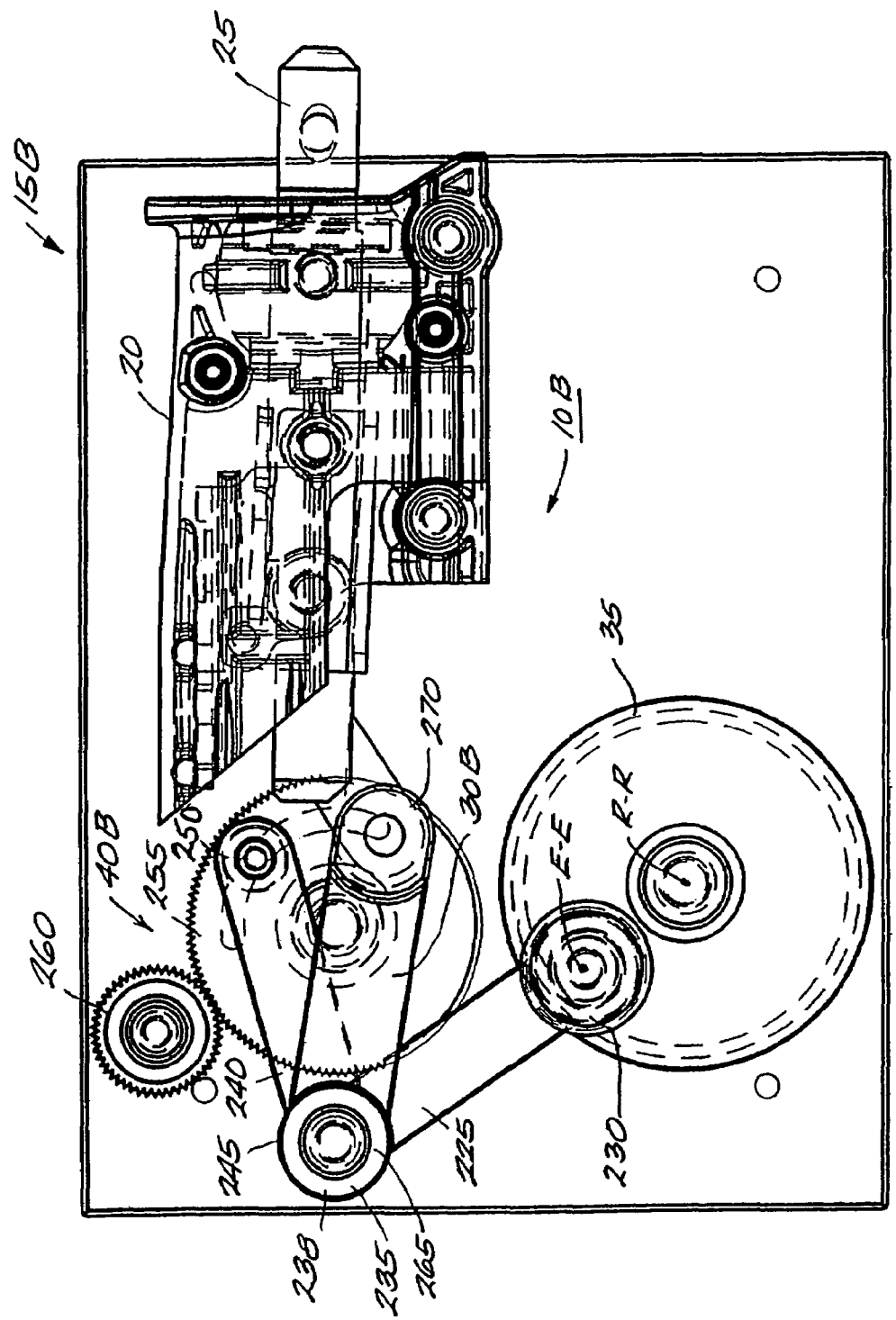
FIG. 25 is a side view of the reciprocating saw configured as shown in FIG. 20 with the spindle in the rearward position.

FIG. 24 illustrates the mechanism 10B configured for an intermediate stroke length with the spindle 25 fully extended. FIG. 25 illustrates the saw 15B as configured in FIG. 24 with the spindle 25 fully retracted. Comparing FIG. 24 to FIGS. 22 and 20 illustrates how the intermediate stroke length is achieved. The adjusting gear 25 is rotated to a position between the first or extreme clockwise position shown in FIG. 22 and the second or, in the illustrated construction, extreme counterclockwise position shown in FIG. 20. In this configuration, the mechanism 10B operates in a manner similar to that described with respect to FIGS. 20 and 21.

Reciprocating saws are used to cut a variety of products and a variety of materials, such as metal conduits and pipes, plastic or PVC components, wood, shingles, dry wall, plaster, etc. An adjustable stroke length, controllable by the user, may allow a user to efficiently cut only the desired components and to not cut other components. An adjustable stroke length may be used to change the cutting speed of the saw, thereby making it cut different materials more efficiently.

In some aspects and in some constructions, infinite adjustment of the stroke length (including and between a minimum stroke length and a maximum stroke length) or of the configuration of the counterweight assembly may be provided. In some aspects and in some constructions, the adjustment of the configuration of the illustrated mechanisms may be accomplished during operation of the mechanism (e.g., with the motor operating). In some aspects and in some constructions, the adjustment of the configuration of the illustrated mechanisms may be accomplished without disassembly of the mechanisms. When the stroke length of the spindle 25 is adjusted, the magnitude and frequency of the vibration caused by the drive mechanism may change, and, in some aspects and in some aspects, the counterweight assembly may be adjusted to counterbalance the different forces caused by the adjustment of the stroke length.

It should be understood that the terms "maximum", "minimum" or "extreme" as used herein are not intended to indicate the maximum or minimum stroke length or most extreme position possible. Rather, the terms are meant to convey the maximum or minimum position or stroke length of the construction illustrated with greater maximums or extremes and lesser minimums still being possible. Therefore, the terms maximum, minimum or extreme should not be read as limiting the scope of the invention to the stroke lengths or positions illustrated or described herein.

It should also be understood that the terms "forward" or "extended" and "rearward" or "retracted" as used herein are not intended to indicate the forwardmost or rearwardmost position possible. Rather, the terms are meant to convey a forward or extended position or a rearward or retracted position, respectively, in the construction illustrated with farther forward and rearward positions still being possible. Therefore, these terms should not be read as limiting the scope of the invention to the positions illustrated or described herein.

Although particular constructions of the present invention have been shown and described, other alternative constructions will be apparent to those skilled in the art and are within the intended scope of the present invention. Thus, the present invention is to be limited only by the claims.

We claim:

1. A reciprocating saw comprising:
   a housing;
   a motor supported by the housing;
   a spindle supported for reciprocation relative to the housing, the spindle having a front end for supporting a saw blade and being movable through a cutting stroke and a return stroke, the cutting stroke and the return stroke having a stroke length;
   a spindle drive mechanism connected between the motor and the spindle and operable to reciprocate the spindle;
   a counterweight supported for movement relative to the housing, a movement of the counterweight in a direction substantially opposite a movement of the spindle substantially balancing at least a portion of the movement of the spindle;
   a counterweight drive mechanism operable to move the counterweight relative to the housing; and
   an adjustment assembly having an actuator extending outwardly through the housing and being operable to adjust an extent of movement of the counterweight relative to the housing in response to adjusting the stroke length of the spindle.

2. The reciprocating saw of claim 1, wherein the counterweight has a range of movement relative to the housing, and wherein the adjustment assembly is operable to adjust the range of movement of the counterweight relative to the housing.

3. The reciprocating saw of claim 2, wherein the counterweight has a stroke length defining the range of movement, and wherein the adjustment assembly is operable to adjust the stroke length of the counterweight.

4. The reciprocating saw of claim 3, wherein, in a first condition of the adjustment assembly, the counterweight has a first stroke length, and wherein, in a second condition of the adjustment assembly, the counterweight has a second stroke length, the second stroke length being different than the first stroke length.

5. The reciprocating saw of claim 3, wherein the counterweight has a center of mass, the center of mass being movable relative to the housing between a first position and a second position, a distance between the first position and the second position being the stroke length of the counterweight.

6. The reciprocating saw of claim 5, wherein the adjustment assembly is operable to adjust the distance between the first position and the second position.

7. The reciprocating saw of claim 1, wherein the counterweight drive mechanism includes
   a rotary member supported for rotation relative to the housing and drivable by the motor, and a drive arm connected between the rotary member and the counterweight, rotation of the rotary member causing the drive arm to move the counterweight relative to the housing.

8. The reciprocating saw of claim 7, wherein the rotary member is rotatable about a rotary axis, and wherein the drive arm is connected to the rotary member along an eccentric axis offset from the rotary axis.

9. The reciprocating saw of claim 7, wherein the spindle drive mechanism includes the rotary member and a spindle drive arm connected between the rotary member and the spindle, rotation of the rotary member causing the spindle drive arm to reciprocate the spindle.

10. The reciprocating saw of claim 1, wherein the spindle has a stroke length relative to the housing, and wherein said reciprocating saw further comprises a spindle adjustment assembly operable to adjust the stroke length of the spindle.

11. The reciprocating saw of claim 10, wherein the adjustment assembly provides at least a portion of the spindle adjustment assembly.

12. A reciprocating saw comprising:
a housing;
a motor supported by the housing;
a spindle supported for reciprocation relative to the housing, the spindle having a front end for supporting a saw blade and being movable through a cutting stroke and a return stroke, the cutting stroke having a stroke length;
a spindle drive mechanism connected between the motor and the spindle and operable to reciprocate the spindle;
a spindle adjustment assembly operable to adjust the stroke length of the spindle;
a counterweight supported for movement relative to the housing, a movement of the counterweight in a direction substantially opposite a movement of the spindle substantially balancing at least a portion of the movement of the spindle;
a counterweight drive mechanism operable to move the counterweight relative to the housing; and
a counterweight adjustment assembly having an actuator extending outwardly through the housing and being operable to adjust an extent of the movement of the counterweight relative to the housing in response to adjusting the stroke length of the spindle.

13. The reciprocating saw of claim 12, wherein the spindle adjustment assembly provides at least a portion of the counterweight adjustment assembly.

14. The reciprocating saw of claim 12, wherein the counterweight adjustment assembly provides at least a portion of the spindle adjustment assembly.

15. The reciprocating saw of claim 12, wherein the spindle drive mechanism provides at least a portion of the counterweight drive mechanism.

16. The reciprocating saw of claim 12, wherein the counterweight drive mechanism provides at least a portion of the spindle drive mechanism.

17. The reciprocating saw of claim 16, wherein the counterweight drive mechanism includes
a rotary member supported for rotation relative to the housing and drivable by the motor, and
a drive arm connected between the rotary member and the counterweight, rotation of the rotary member causing the drive arm to move the counterweight relative to the housing.

18. The reciprocating saw of claim 17, wherein the spindle drive mechanism includes the rotary member and a spindle drive arm connected between the rotary member and the spindle, rotation of the rotary member causing the spindle drive arm to reciprocate the spindle.

19. A reciprocating saw comprising:
a housing;
a motor supported by the housing;
a spindle mounted for reciprocation relative to the housing, the spindle having a front end for supporting a saw blade and being movable through a cutting stroke and a return stroke, the cutting stroke having a stroke length;
a rotary member supported for rotation about a rotary axis;
an adjusting assembly adjustably connected with the rotary member, the adjusting assembly defining an eccentric axis at a position relative to the rotary axis, the position of the eccentric axis being adjustable relative to the rotary axis to adjust the stroke length of the spindle;
an arm member having a drive end connected to the rotary member along the eccentric axis and a spindle end connected to the spindle; and
a bearing connected to the drive end of the arm member, the bearing having an inner race and an outer race, the outer race being connected to the arm member, the eccentric axis intersecting the inner race.

20. The reciprocating saw of claim 19, wherein the arm member is pivotally connected to the rotary member.

21. The reciprocating saw of claim 19, wherein the eccentric axis is parallel to the rotary axis and spaced a distance from the rotary axis, the distance being adjustable between a first distance and a second distance.

22. The reciprocating saw of claim 19, further comprising a counterweight assembly supported for movement during reciprocation of the spindle to substantially balance at least the spindle.

23. The reciprocating saw of claim 22, wherein the counterweight has a counterweight stroke length, and wherein said reciprocating saw further comprises a counterweight adjustment assembly operable to adjust the counterweight stroke length.

24. The reciprocating saw of claim 23, wherein the counterweight has a center of mass, the counterweight stroke length being defined between a first position of the center of mass and a second position of the center of mass.

25. A reciprocating saw comprising:
a housing;
a motor supported by the housing;
a spindle mounted for reciprocation relative to the housing, the spindle having a front end for supporting a saw blade and being movable through a cutting stroke and a return stroke, the cutting stroke having a stroke length;
a rotary member supported for rotation about a rotary axis;
an adjusting assembly adjustably connected with the rotary member, the adjusting assembly defining an eccentric axis at a position relative to the rotary axis, the position of the eccentric axis being adjustable relative to the rotary axis to adjust the stroke length of the spindle; and
an arm member having a drive end connected to the rotary member along the eccentric axis and a spindle end connected to the spindle;
wherein the adjusting assembly further includes an arcuate gear having a center axis, the center axis being coincident with the eccentric axis, the arcuate gear movably engaging the rotary member.

26. The reciprocating saw of claim 25, further comprising a fastener disposed along the eccentric axis, the fastener fixedly connecting the arcuate gear to the drive end of the arm member, the fastener pivotally connecting the arcuate gear to the rotary member.

27. the reciprocating saw of claim 25, wherein the adjusting assembly further includes an actuator operatively engaged with the arcuate gear and selectively engageable with the rotary member, wherein, when the actuator is engaged with the rotary member, the stroke length is fixed and, when the actuator is disengaged from the rotary member, adjustment of the actuator adjusts the stroke length of the spindle.

28. A reciprocating saw comprising:
a housing;
a motor supported by the housing;
a spindle mounted for reciprocation relative to the housing, the spindle having a front end for supporting a saw blade and being movable through a cutting stroke and a return stroke, the cutting stroke having a stroke length;
a rotary member supported for rotation about a rotary axis;
an adjusting assembly adjustably connected with the rotary member, the adjusting assembly defining an eccentric axis at a position relative to the rotary axis, the position of the eccentric axis being adjustable relative to the rotary axis to adjust the stroke length of the spindle; and
an arm member having a drive end connected to the rotary member along the eccentric axis and a spindle end connected to the spindle;
wherein the rotary member further includes
a drive element connected to a drive shaft, and
an adjusting element connected to the drive shaft.

29. The reciprocating caw of claim 28, wherein the drive element is a gear rotatable about the rotary axis.

30. The reciprocating saw of claim 28, wherein the adjusting element is a gear fixed to the drive shaft.

31. A reciprocating device comprising:
a housing;
a motor supported by the housing;
a spindle supported for reciprocation relative to the housing, the spindle having a front end for supporting a saw blade and being movable through a cutting stroke and a return stroke, the cutting stroke and the return stroke having a stroke length;
a spindle drive mechanism connected between the motor and the spindle and operable to reciprocate the spindle;
a counterweight supported for movement relative to the housing, a movement of the counterweight in a direction substantially opposite a movement of the spindle substantially balancing at least a portion of the movement of the spindle;
a counterweight drive mechanism operable to move the counterweight relative to the housing; and
an adjustment assembly having an actuator extending outwardly through the housing and being operable to adjust an extent of movement of the counterweight relative to the housing in response to adjusting the stroke length of the spindle.

32. the reciprocating device of claim 31, wherein the counterweight has a range of movement relative to the housing, and wherein the adjustment assembly is operable to adjust the range of movement of the counterweight relative to the housing.

33. The reciprocating device of claim 32, wherein the counterweight has a stroke length defining the range of movement, and wherein the adjustment assembly is operable to adjust the stroke length of the counterweight.

34. the reciprocating device of claim 33, wherein the counterweight has a center of mass, the center of mass being movable relative to the housing between a first position and a second position, a distance between the first position and the second position being the stroke length of the counterweight.

35. the reciprocating device of claim 34, wherein the adjustment assembly is operable to adjust the distance between the first position and the second position.

36. The reciprocating device of claim 32, wherein, in a first condition of the adjustment assembly, the counterweight has a first stroke length, and wherein, in a second condition of the adjustment assembly, the counterweight has a second stroke length, the second stroke length being different than the first stroke length.

37. The reciprocating device of claim 31, wherein the counterweight drive mechanism includes
a rotary member supported for rotation relative to the housing and drivable by the motor, and
a drive arm connected between the rotary member and the counterweight, rotation of the rotary member causing the drive arm to move the counterweight relative to the housing.

38. The reciprocating device of claim 37, wherein the rotary member is rotatable about a rotary axis, and wherein the drive arm is connected to the rotary member along an eccentric axis offset from the rotary axis.

39. The reciprocating device of claim 37, wherein the spindle drive mechanism includes the rotary member and a spindle drive arm connected between the rotary member and the spindle, rotation of the rotary member causing the spindle drive arm to reciprocate the spindle.

40. The reciprocating device of claim 31, wherein the spindle has a stroke length relative to the housing, and wherein said reciprocating device further comprises a spindle adjustment assembly operable to adjust the stroke length of the spindle.

41. the reciprocating device of claim 40, wherein the adjustment assembly provides at least a portion of the spindle adjustment assembly.

* * * * *